United States Patent [19]

McFarland et al.

[11] Patent Number: 5,442,757

[45] Date of Patent: * Aug. 15, 1995

[54] COMPUTER PROCESSOR WITH DISTRIBUTED PIPELINE CONTROL THAT ALLOWS FUNCTIONAL UNITS TO COMPLETE OPERATIONS OUT OF ORDER WHILE MAINTAINING PRECISE INTERRUPTS

[75] Inventors: Harold L. McFarland, San Jose; David R. Stiles, Sunnyvale; Korbin S. Van Dyke, Fremont; Shrenik Mehta, San Jose; John G. Favor, San Jose; Dale R. Greenley, San Jose; Robert A. Cargnoni, Sunnyvale, all of Calif.

[73] Assignee: NexGen, Inc., Milpitas, Calif.

[ * ] Notice: The portion of the term of this patent subsequent to Jul. 6, 2010 has been disclaimed.

[21] Appl. No.: 25,439

[22] Filed: Mar. 3, 1993

Related U.S. Application Data

[63] Continuation of Ser. No. 483,223, Feb. 21, 1990, Pat. No. 5,226,126, which is a continuation-in-part of Ser. No. 315,358, Feb. 24, 1989, abandoned.

[51] Int. Cl.6 .............................................. G06F 15/16
[52] U.S. Cl. ................................. 395/375; 395/775; 395/800
[58] Field of Search ................. 395/375, 800, 775, 725

[56] References Cited

U.S. PATENT DOCUMENTS

| | | | |
|---|---|---|---|
| 4,425,617 | 1/1984 | Sherwood | 395/425 |
| 4,521,851 | 6/1985 | Trubisky et al. | 395/375 |
| 4,578,750 | 3/1986 | Amdahl et al. | 395/375 |
| 4,594,655 | 6/1986 | Hao et al. | 395/775 |
| 4,594,660 | 6/1986 | Guenthner et al. | 395/250 |
| 4,689,765 | 8/1987 | Hooper | 395/775 |
| 4,736,288 | 4/1988 | Shintani et al. | 395/375 |
| 4,760,519 | 7/1988 | Papworth et al. | 395/375 |
| 4,773,041 | 9/1988 | Hassler et al. | 395/400 |
| 4,774,655 | 9/1988 | Smith et al. | 395/400 |
| 4,775,927 | 10/1988 | Hester et al. | 395/375 |
| 4,782,661 | 11/1988 | Inagami et al. | 395/800 |
| 4,783,736 | 11/1988 | Ziegler et al. | 395/425 |
| 4,785,395 | 11/1988 | Keeley | 395/425 |
| 4,794,521 | 12/1988 | Ziegler et al. | 395/425 |
| 4,807,115 | 2/1989 | Torng | 395/375 |
| 4,831,515 | 5/1989 | Kamada et al. | 395/375 |
| 4,894,772 | 1/1990 | Langendorf | 395/375 |
| 4,903,196 | 2/1990 | Pomerene et al. | 395/375 |
| 4,908,750 | 3/1990 | Jablow | 395/650 |
| 4,916,652 | 4/1990 | Schwarz et al. | 364/748 |
| 4,924,466 | 5/1990 | Gregor et al. | 371/12 |
| 4,942,525 | 7/1990 | Shintani et al. | 395/375 |
| 4,943,916 | 7/1990 | Asano et al. | 395/775 |
| 4,970,641 | 11/1990 | Hester et al. | 395/400 |
| 4,991,090 | 2/1991 | Emma et al. | 395/375 |
| 5,010,482 | 4/1991 | Keller et al. | 395/275 |
| 5,018,063 | 5/1991 | Liu | 395/600 |
| 5,063,497 | 11/1991 | Cutler et al. | 395/800 |
| 5,067,069 | 11/1991 | Fite et al. | 395/375 |

(List continued on next page.)

OTHER PUBLICATIONS

"Implementing Precise Interrupts in Pipelined Processors" Smith et al, IEEE vol. 37, No. 5, May 1988, pp. 562–573.

(List continued on next page.)

Primary Examiner—Parshotam S. Lall
Assistant Examiner—Viet Vu
Attorney, Agent, or Firm—Townsend and Townsend Khourie and Crew

[57] ABSTRACT

A pipeline control system is distributed over the functional units (15, 17, 20, 25) in a processor (10). Decoder logic (12) issues operations, each with an associated tag, to the functional units, with up to n operations allowed to be outstanding. The units execute the operations and report termination information back to the decoder logic, but do not irrevocably change the state of the machine. Based on the termination information, the decoder logic retires normally terminated operations in order. If an operation terminates abnormally, the decoder logic instructs the units to back out of those operations that include and are later than the operation that terminated abnormally.

56 Claims, 11 Drawing Sheets

Microfiche Appendix Included
(1 Microfiche, 97 Pages)

U.S. PATENT DOCUMENTS 5,075,840 12/1991 Grohoski et al. .................. 395/800
5,133,077 6/1992 Karne et al. ....................... 395/800

OTHER PUBLICATIONS

"Reducing the Branch Penalty in Pipeline Processsors" Lilja, IEEE, Jul. 1988, pp. 47–55.

Stiles, D. R., et al., "Pipeline Control for a Single Cycle VLSI Implementation of a Complex Instruction Set Computer," *Computer Society of the IEEE*, pp. 504–508 (1989).

Thomas, A. T., "A Single Cycle VLSI CISC-Based Workstation: System Overview and Performance Characteristics," *Computer Society of the IEEE*, pp. 500–503, (1989).

Raza, A., "Technology Constraints on VLSI Processor Implementation," *Computer Society of the Thirty-Fourth IEEE*, pp. 509–512, (1989).

Flynn, M. J., et al., "The IBM System/360 Model 91: Some Remarks on System Development," *IBM Journal of Research and Development*, pp. 2–7, (Jan. 1967).

Anderson, D. W. et al., "The IBM System/360 Model 91: Machine Philosophy and Instruction-Handling," *IBM Journal of Research and Development*, pp. 8–24, (Jan. 1967).

Tomasulo, R. M., "An Efficient Algorithm for Exploiting Multiple Arithmetic Units," *IBM Journal of Research and Development*, pp. 25–33, (Jan. 1967).

Anderson, S. M., et al., "The IBM System/300 Model 91: Floating Point Execution Unit," *IBM Journal of Research and Development*, pp. 34–53, (Jan. 1967).

Boland, L. J., et al., "IBM System/360 Model 91: Storage System," *IBM Journal of Research and Development*, pp. 54–58, (Jan. 1967).

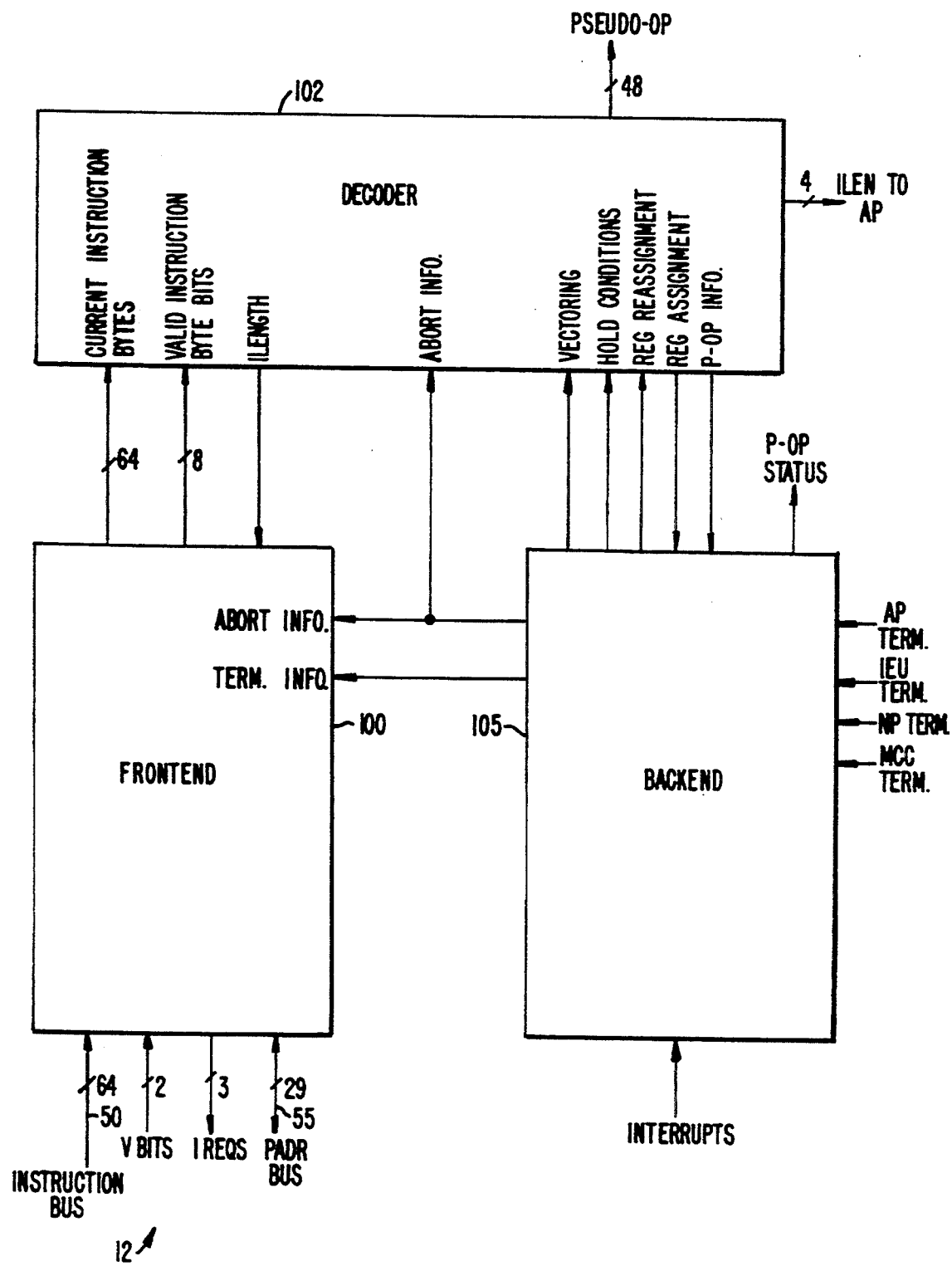
FIG._2.

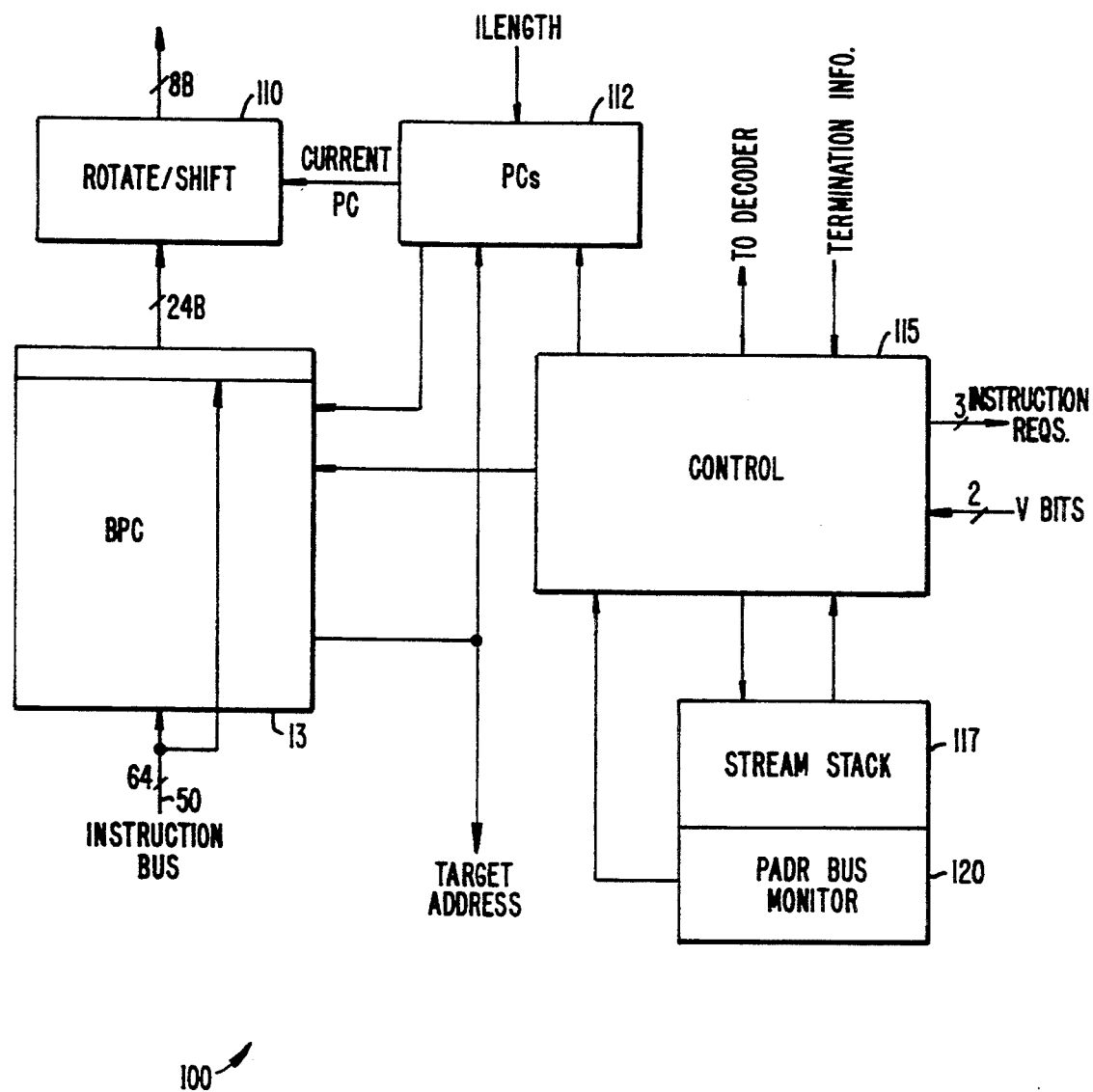
FIG._3A.

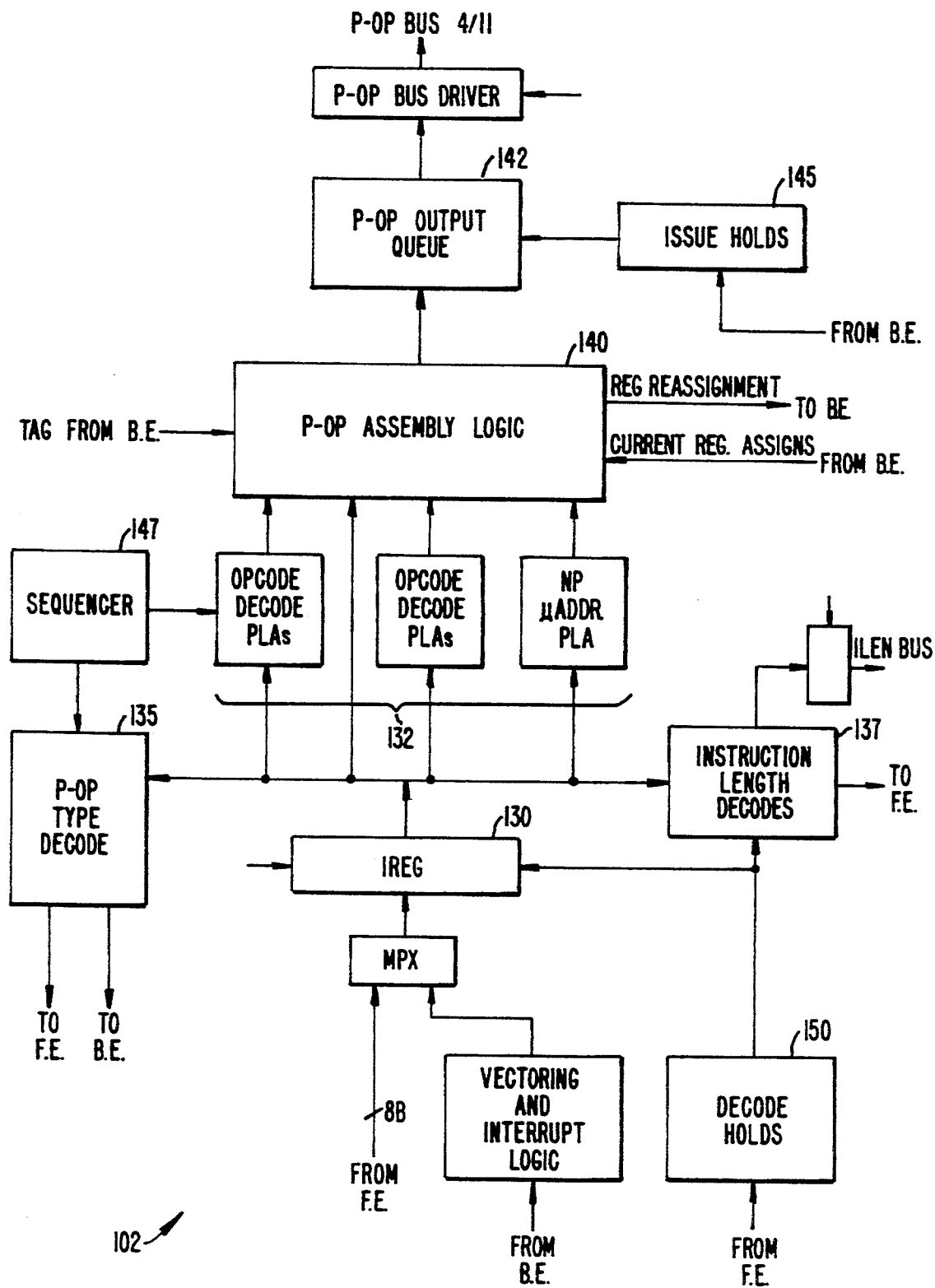
FIG._3B.

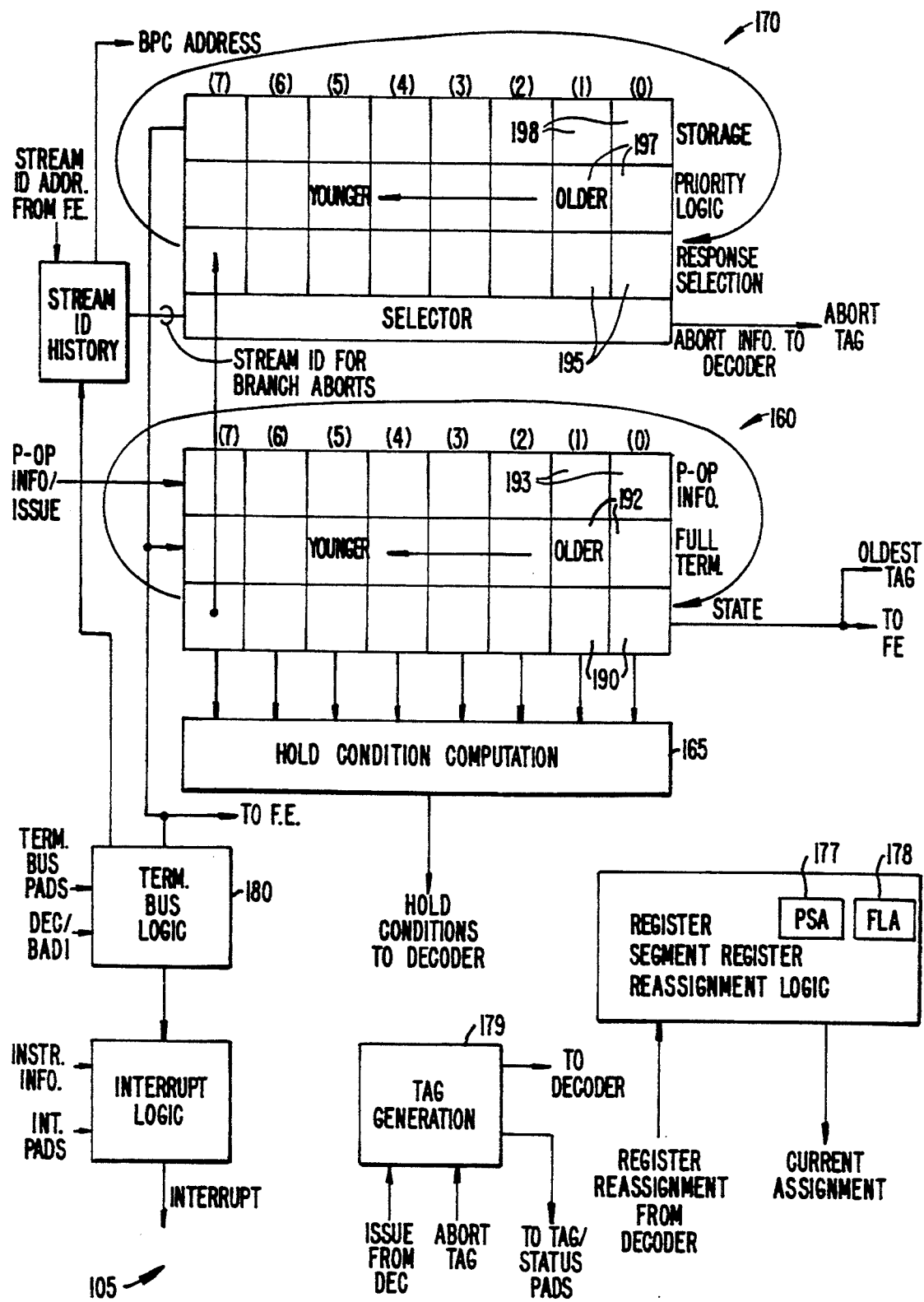
FIG._3C.

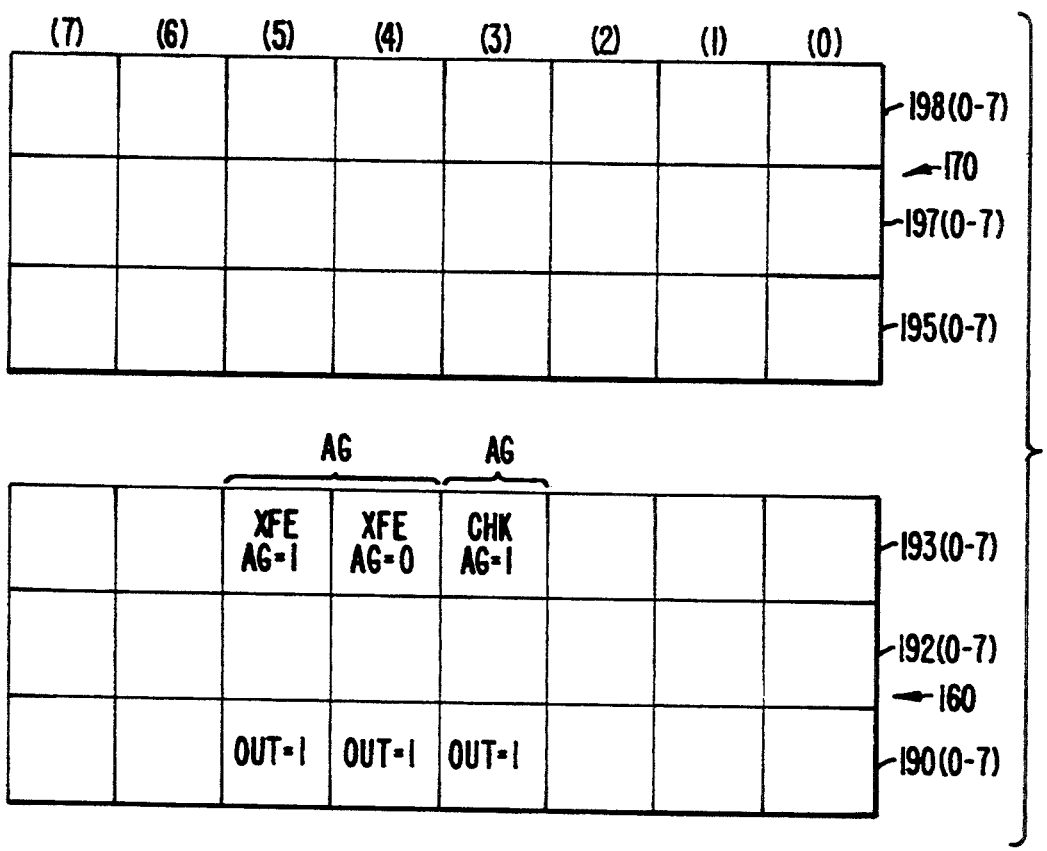
FIG._4A.
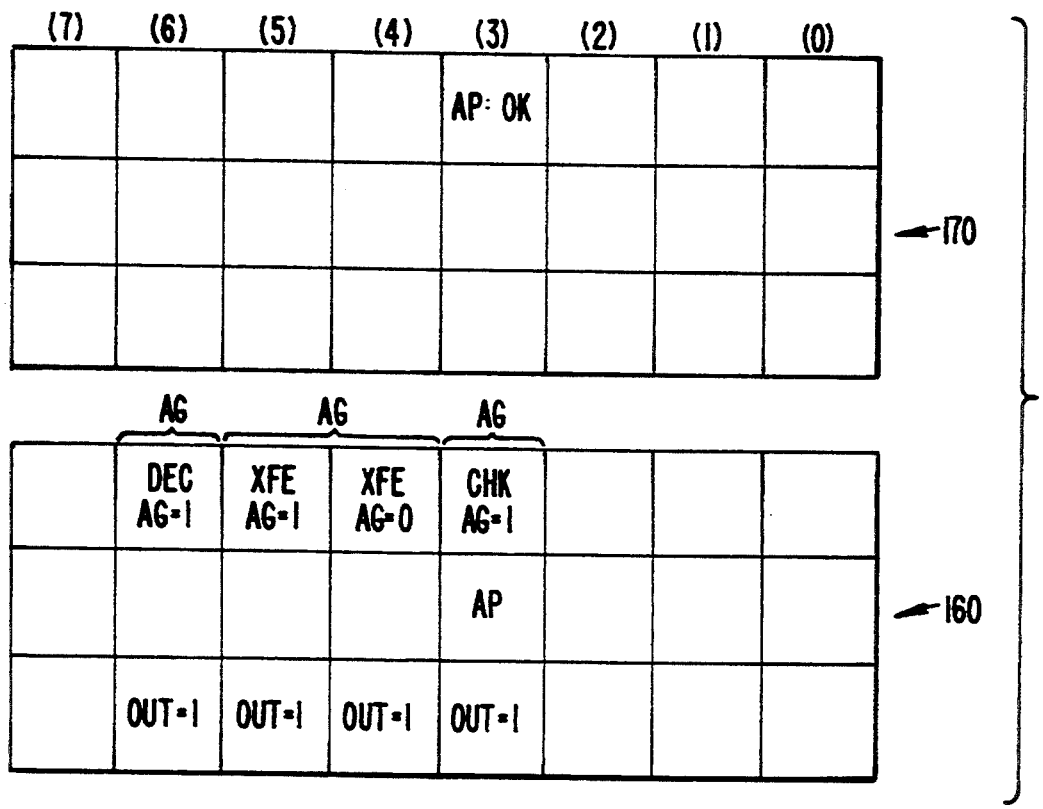
FIG._4B.

|  (7) | (6) | (5) | (4) | (3) | (2) | (1) | (0) |
|---|---|---|---|---|---|---|---|
|  | IEU:OK |  | AP:OK | AP:OK<br>IEU:OK |  |  |  |
|  |  |  |  |  |  |  |  |
|  |  |  |  |  |  |  |  |

198(0-7)
170
197(0-7)
195(0-7)

|  | AG | | AG | | AG | | | AG |
|---|---|---|---|---|---|---|---|---|
| XFE<br>AG=0 | DEC<br>AG=1 | XFE<br>AG=1 | XFE<br>AG=0 | CHK<br>AG=1 |  | DEC<br>AG=1 | XFE<br>AG=1 |
|  | IEU |  | AP | AP<br>IEU |  |  |  |
| OUT=1 | OUT=1 | OUT=1 | OUT=1 | OUT=0 |  | OUT=1 | OUT=1 |

|  (7) | (6) | (5) | (4) | (3) | (2) | (1) | (0) |
|---|---|---|---|---|---|---|---|
| AP:OK<br>IEU:OK | AP:OK<br>IEU:OK | AP:OK<br>IEU:OK | AP:OK<br>IEU:OK | AP:OK<br>IEU:OK |  | IEU:OK | AP:PF |
|  |  |  |  |  |  |  |  |
|  |  |  |  |  |  |  |  |

170

|  | AG | AG | AG | AG | | AG | AG |
|---|---|---|---|---|---|---|---|
| XFE<br>AG=0 | DEC<br>AG=1 | XFE<br>AG=1 | XFE<br>AG=0 | CHK<br>AG=1 |  | DEC<br>AG=1 | XFE<br>AG=1 |
| AP<br>IEU | AP<br>IEU | AP<br>IEU | AP<br>IEU | AP<br>IEU |  | IEU | AP |
| OUT=0 | OUT=0 | OUT=0 | OUT=0 | OUT=0 |  | OUT=0 | OUT=0 |

160

ABORT
TAG=7

FIG._4D.

| TAG → | 0 | 1 | 2 | 3 | 4 | 5 | 6 | 7 | | PHYSICAL REGISTERS | |
|---|---|---|---|---|---|---|---|---|---|---|---|
| TAIL | 15 | 3 | 5 | 4 | | | | | | PR15 | V |
| | 14 | 15 | 8 | 5 | | | | | | PR14 | V |
| | 13 | 14 | 15 | 8 | | | | | 178 | PR13 | V |
| | 12 | 13 | 14 | 15 | | | | | | PR12 | V |
| | 11 | 12 | 13 | 14 | | | | | | PR11 | V |
| | 10 | 11 | 12 | 13 | | | | | | PR10 | V |
| HEAD | 9 | 10 | 11 | 12 | | | | | | PR9 | V |
| VR0 | 8 | 9 | 9 | 9 | | | | | | PR8 | V |
| VR1 | 7 | 7 | 7 | 7 | | | | | | PR7 | V |
| VR2 | 6 | 6 | 6 | 6 | | | | | | PR6 | V |
| VR3 | 5 | 5 | 10 | 10 | | | | | | PR5 | V |
| VR4 | 4 | 4 | 4 | 11 | | | | | | PR4 | V |
| VR5 | 3 | 3 | 3 | 3 | | | | | | PR3 | V |
| VR6 | 2 | 2 | 2 | 2 | | | | | | PR2 | V |
| VR7 | 1 | 1 | 1 | 1 | | | | | | PR1 | V |

FREE LIST (TAIL ... HEAD), VIRTUAL REGISTERS (VR0–VR7)

177

IN DEC                                                   IN AP, IEU

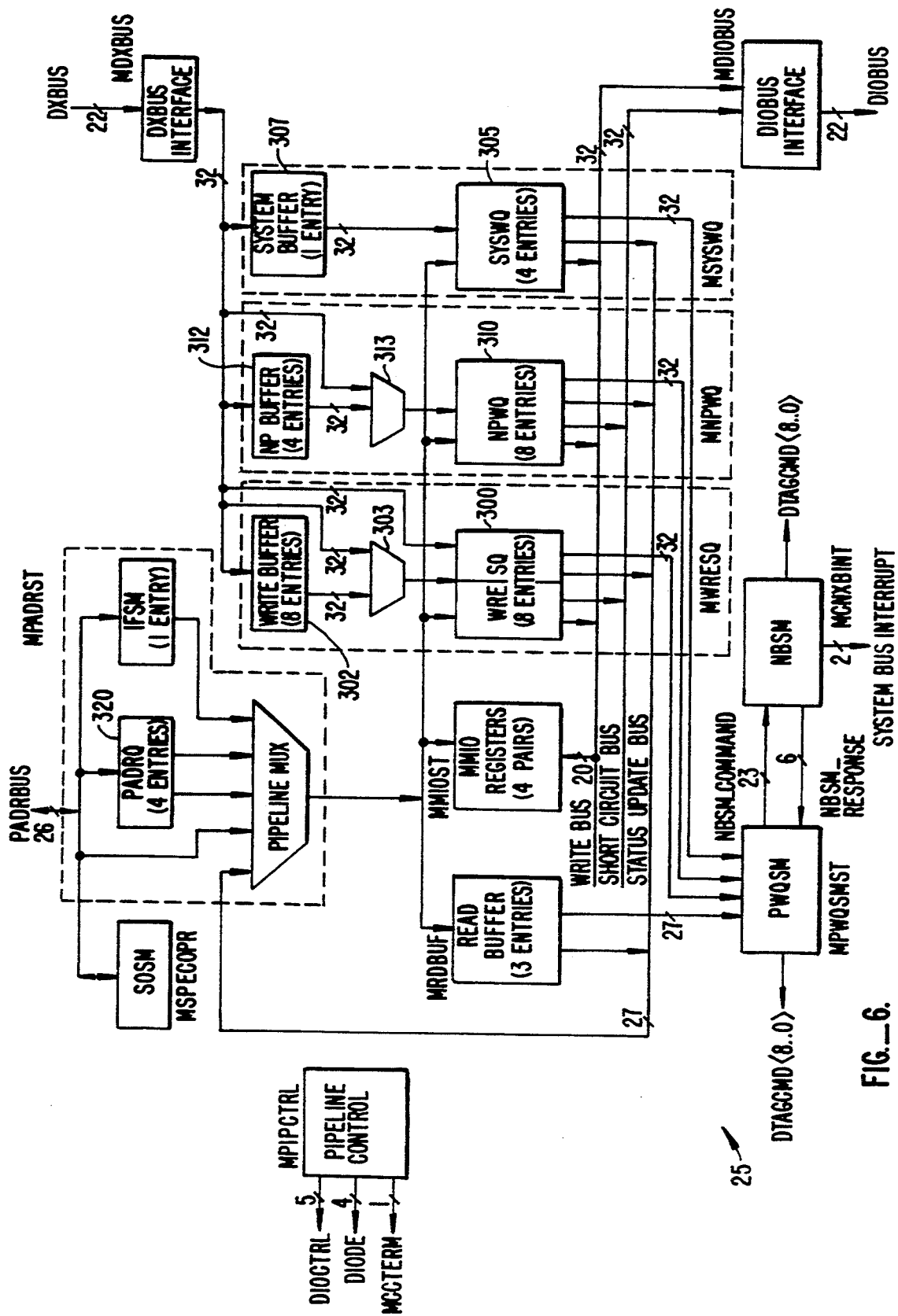
FIG._6.

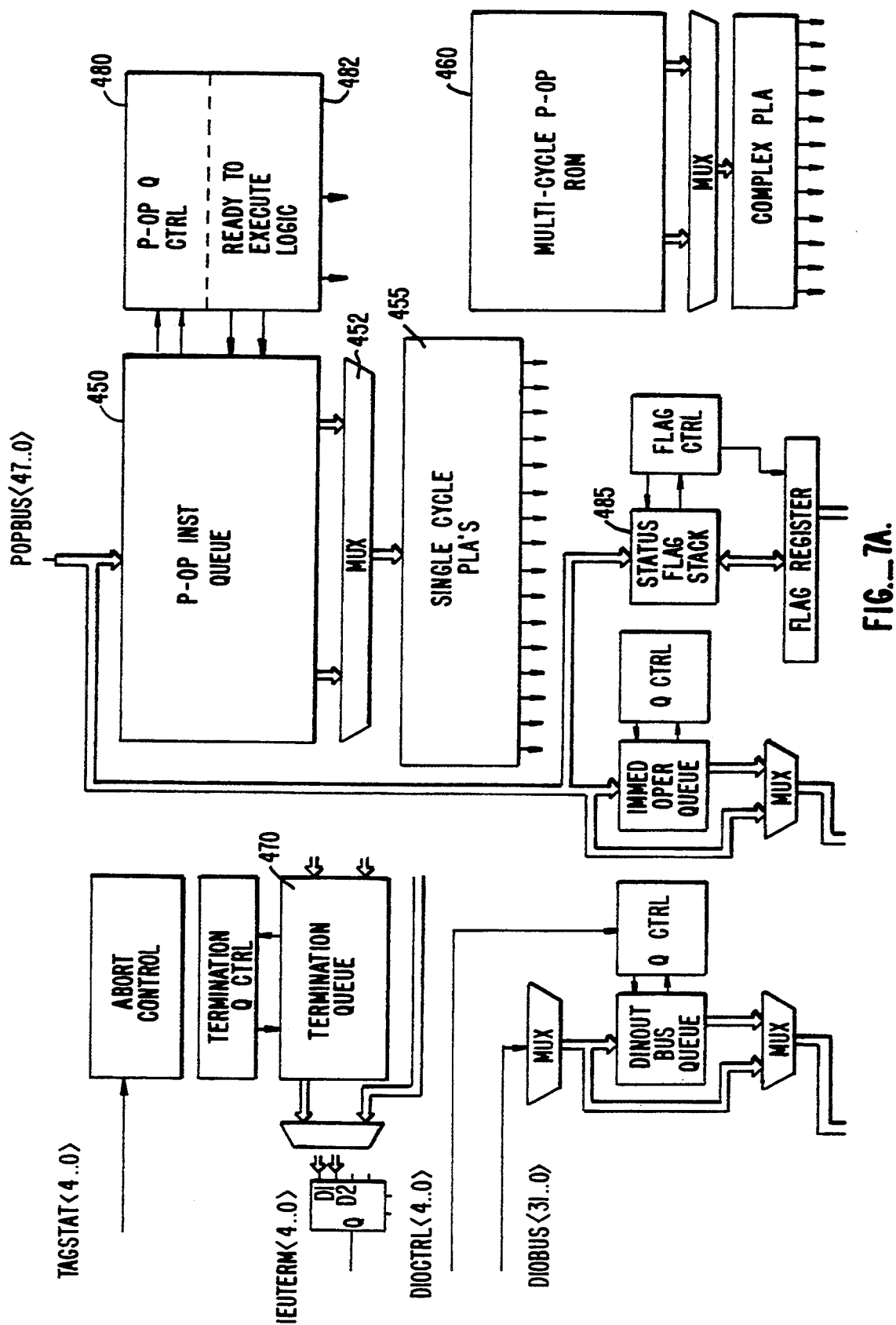
FIG._7A.

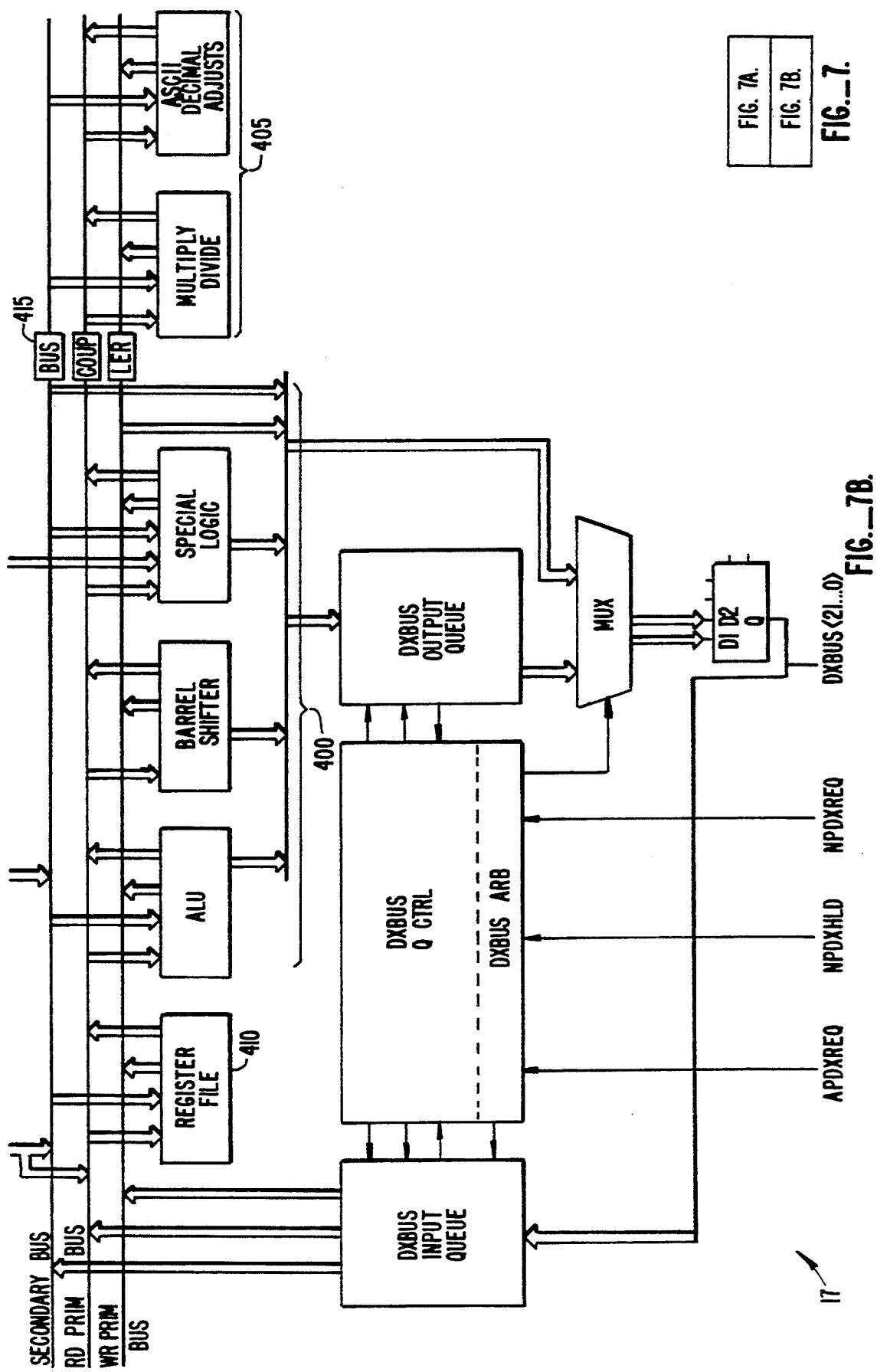

COMPUTER PROCESSOR WITH DISTRIBUTED PIPELINE CONTROL THAT ALLOWS FUNCTIONAL UNITS TO COMPLETE OPERATIONS OUT OF ORDER WHILE MAINTAINING PRECISE INTERRUPTS

CROSS REFERENCE TO RELATED APPLICATION

This is a continuation of Ser. No. 483,223, Feb. 21, 1990, U.S. Pat. No. 5,226,126, which is a continuation-in-part of Ser. No. 315,358, Feb. 24, 1989, abandoned.

MICROFICHE APPENDIX

Five microfiche appendices comprising a single fiche with 97 frames are included as part of this application.

BACKGROUND OF THE INVENTION

The present invention relates generally to computers, and more particularly to techniques for efficient pipeline control thereof.

A single cycle implementation of a complex instruction set computer (CISC) architecture requires a deep pipeline. When combined with the complex privilege and protection checks and powerful memory management systems directly supported by a CISC architecture, conventional pipeline control techniques become very complicated. In current technology, the pipeline has to include the effects of multiple chip boundary crossings. In attempting to eliminate as many of these crossings as possible, high levels of VLSI integration are chosen. With a relatively small number of devices in the system, there aren't enough signal pins to run dedicated buses for every purpose. This means that the buses must be used for multiple purposes, greatly complicating the process of designing a centralized control and scheduling mechanism.

SUMMARY OF THE INVENTION

The present invention implements a pipeline control system that is distributed over the functional units in a processor. Each unit defines its own interlocks and pipeline timing. That timing does not have to be precisely mirrored in a centralized controller. The functional units are autonomous, so they do not need to know the precise details of how all other units handle each instruction. The need for complex simulations of pipeline timing is greatly reduced. The invention supports distributed control of the pipeline, by making it possible to back out of modifications to the machine state which should not have been allowed to occur. The invention uses generalized techniques rather than complex special case pipeline control logic, thereby making correct operation of the pipeline more probable. The distributed control combined with the ability to back out of any unwanted change allows significant performance advantages in the area of out-of-order execution, overlap of penalty cycles, and parallel processing of instructions within and between functional units. The additional cost and complexity to implement these capabilities is very slight.

More particularly, decoder logic issues pseudo-operations (p-ops), each with an associated tag, to a plurality of functional units, which are capable of independently executing pops. Up to n p-ops are allowed to be outstanding at a given time. Tags are issued sequentially in a manner that allows the relative age of two outstanding p-ops to be determined. In a specific embodiment the tags are issued over a range of at least 2n and then recycled. This range is sufficient to allow the relative age to be determined by simple subtraction. In a present implementation, 16 tags are issued and 7 p-ops are allowed to be outstanding.

Outstanding p-ops are retired in the order they were issued. A p-op may be retired only when it has completed, i.e., when it has been terminated normally by all concerned functional units. In some cases, a completed p-op otherwise eligible for retirement will be kept outstanding until one or more adjacent younger p-ops have also completed. The tag of the oldest outstanding p-op is communicated to the functional units so that each unit can determine when it can irrevocably modify the state of the machine.

An outstanding p-op is allotted if it is terminated abnormally by a functional unit. In such a case, all younger outstanding p-ops are also aborted. Older outstanding p-ops may also have to be aborted if their retirement is contingent on the successful completion of the abnormally terminating p-op. The tag of the oldest outstanding p-op to be aborted is communicated to the functional units. This allows execution to be aborted in the case of unanticipated program diversion and the machine backed up to the point of diversion.

For an instruction set architecture where there are m programmer-visible (virtual) registers, and up to n register-modifying p-ops are allowed to be outstanding, there are provided at least (m+n) physical registers. A mechanism provides for mapping the virtual registers into physical registers. The mapping is modified to employ a previously unused physical register as the destination of each p-op that will modify a virtual register, allowing the old virtual register's value to be retained in the physical register to which it was previously mapped. There are enough physical registers to assure that if the physical registers that are replaced in the mapping are re-used in order, then by the time a physical register must be re-used, any p-op for which it was mapped to a virtual register will have been retired or aborted. The set of pointers defining the virtual-to-physical mapping and a list of available registers are maintained for each of the n most recently issued p-ops, making it possible to abort any outstanding p-ops and return the virtual registers to their previous values without moving data between registers.

A further technique for allowing the state of the processor to be backed up entails the use of write queues. A write reservation queue buffers writes to memory or data cache for at least the period of time during which the originating p-op (the p-op that generates the address and data) is outstanding. Only when processing has passed the point at which it could become necessary to back out of the memory write, is the write reservation queue entry output to the memory. If the originating p-op is aborted, the queue entry is deleted from the queue. In the event that a younger read p-op seeks to access the memory location to be written into by an outstanding write p-op, the data stored in the write reservation queue is provided to the read p-op. If the write p-op retires, the read p-op has acquired the correct dater without having to wait for the retirement. Conversely, if the write p-op is aborted, the younger read p-op is also aborted, and the machine state is successfully backed up to a point prior to the write.

A further understanding of the nature and advantages of the present invention may be realized by reference to the remaining portions of the specification and the drawings.

BRIEF DESCRIPTION ON THE DRAWINGS

FIG. 2 is a high-level block diagram of the decoder (DEC);

Figure 1:
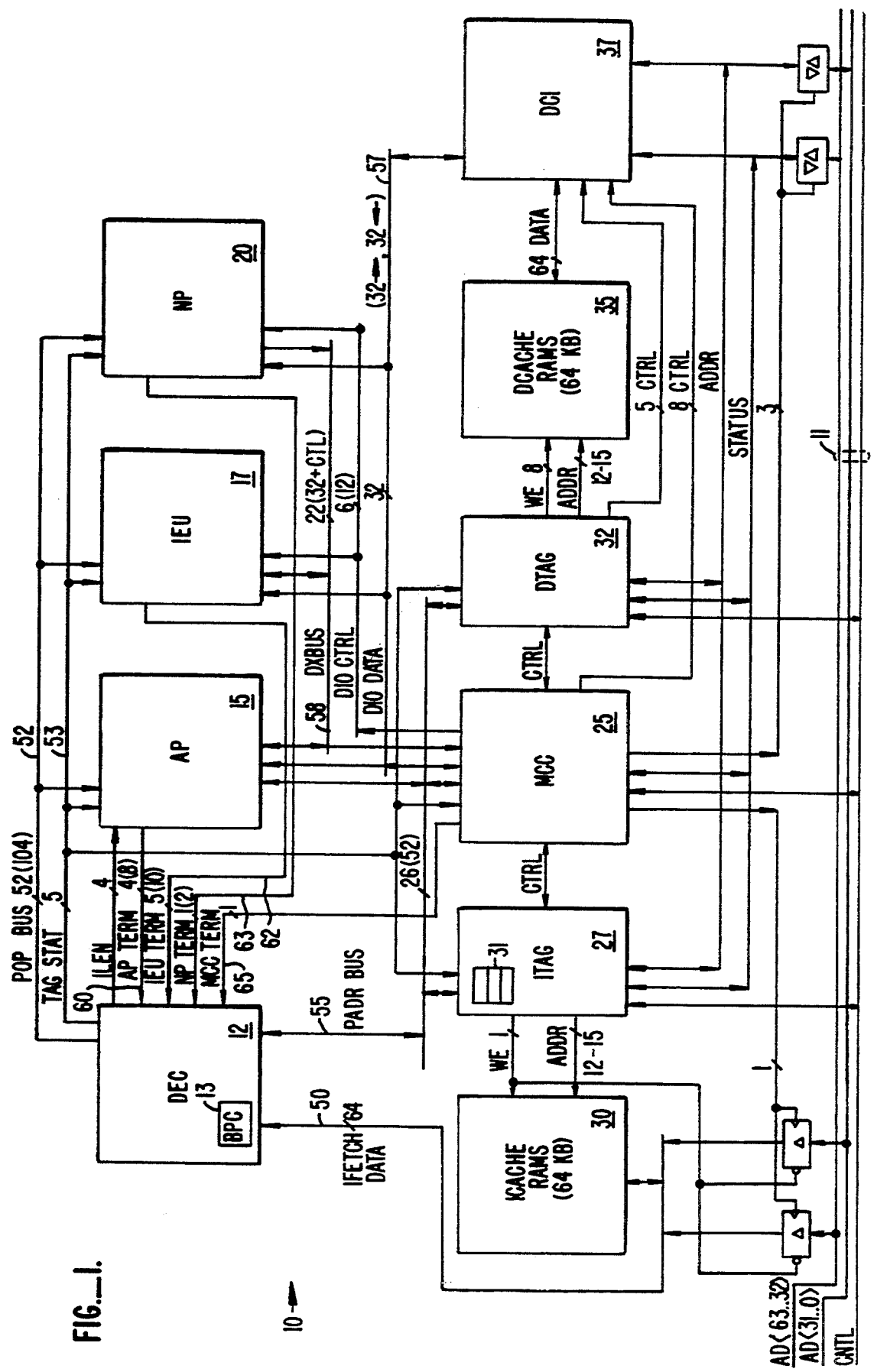
FIG. 1 is a block diagram of a computer system incorporating the present invention.

FIGS. 3A–C are detailed block diagram of the DEC;

FIGS. 4A–D are block diagrams showing the tracking of a particular sequence;

FIG. 5 is a schematic illustrating register reassignments;

FIG. 6 is a block diagram of the memory and cache controller (MCC); and

FIG. 7 is a block diagram of the integer execution unit (IEU).

BRIEF DESCRIPTION OF THE TABLES

Table 1 shows the p-op bus format;

Table 2 shows the physical address bus (PAdrBus) format;

Table 3 shows the data cache bus (DIOBus) format;

Table 4 shows the dam exchange bus (DXBus) format;

Table 5 shows the IEU termination bus format;

Table 6 shows the AP termination bus format; and

Table 7 shows a sequence of p-op issuances and terminations.

DESCRIPTION OF A SPECIFIC EMBODIMENT

System Overview

FIG. 1 is a block diagram of a CPU 10 incorporating the present invention. The CPU, sometimes referred to as the F86, is designed to execute an instruction set (macro-instructions) compatible with that of the Intel 80386, as described in the *Intel 80386 Programmer's Reference Manual* published by Intel Corporation, Santa Clara, Calif., 1986. Each block in the diagram corresponds generally to a separate integrated circuit chip or group of chips in a current embodiment. The CPU communicates with external devices such as memory controllers, I/O devices, and possibly other CPU's via a system bus 11. References below to functional units will normally be understood to mean elements within CPU 10, not such external devices.

An Instruction Decoder (DEC) 12 performs instruction fetch, instruction decode, and pipeline control. DEC 12 optionally interleaves instruction prefetch of up to three simultaneous instruction streams. DEC 12 contains a fully associative Branch Prediction Cache (BPC) 13. The BPC is an integrated structure which contains dynamic branch history data, a physical branch target address, and a branch target buffer for each cache entry. As branch instructions are decoded, the BPC is consulted for information about that branch. Independent of the direction predicted, branches are executed in a single cycle and do not cause pipeline bubbles.

On each cycle, a macro-instruction is selected from one of the three instruction buffers or a branch target buffer in the BPC. The macro-instruction is decoded, assembled into an internal 96-bit decoded instruction word, referred to as a pseudo-op (p-op) or sometimes as an instruction or operation, and dispatched to the various functional units. Instruction decode generally proceeds at a single cycle rate. Each p-op issued by DEC 12 is given a tag which uniquely identifies each p-op currently outstanding in the machine. Tags are issued in increasing order, allowing easy determination of relative age of any two outstanding tags. Bus transactions between chips include the tag of the originating p-op. Functional units pair up p-op, addresses, and operands with these tags.

DEC 12 is also responsible for tracking the status of outstanding p-op, pipeline control, and for invoking exception processing when needed.

An address Preparation Unit (AP) 15 calculates effective addresses, performs segment relocation, and implements a demand paged memory management system. It contains a translation lookaside buffer (TLB).

An Integer Execution Unit (IEU) 17 performs single cycle execution of most integer instructions. It contains an 8×32 multiplier and accumulator array, as well as microcode for multiply and divide instructions. The pipeline control architecture allows the IEU to perform parallel and/or out-of-order execution of integer instructions.

A Numerics Processor (NP) 20 may optionally be included in the CPU. It is a high performance implementation of the IEEE floating point standard. The NP is integrated into the pipeline and does not incur any special overhead for the transfer of instructions and operands. Integer (IEU) and floating point (NP) instructions execute concurrently.

A Memory and Cache Controller (MCC) 25 is responsible for controlling the instruction and data caches and implements the cache coherency protocol. The MCC controls the interface to the system bus 11, supporting high speed single and block mode transfers between cache and memory. As described below, the MCC also contains write reservation tables for integer, floating point, and system writes, and includes read after write short circuit paths.

An instruction cache subsystem includes a tag RAM chip (ITag) 27 and cache RAM chips (ICache) 30. Each entry in ITag 27 contains the address tag, a Valid bit, and an Attention bit for a corresponding line in ICache 30. The Attention bit indicates that the DEC chip may also have data from this line cached in the BPC. ITag 27 also includes a set of instruction stream address registers 31, each of which contains a fetch address associated with a respective one of three possibly outstanding streams.

A data cache subsystem includes a tag RAM chip (DTag) 32 and cache RAM chips (ICache) 35. DTag 32 contains the address tag and line state bits for each line in DCache 35. The possible line states are Absent, Shared Read, Owned Clean, and Owned Dirty, supporting a writeback multiprocessor cache coherency protocol (modified write once). The tag RAM is dual ported to allow both CPU and bus snooping cache lookups in a single cycle. A Data Cache Interface (DCI) chip 37 interfaces DCache 35 to system bus 11.

Each functional unit chip is packaged in a custom ceramic PGA which contains power and ground planes and associated decoupling capacitors. Roughly 25% of the pins are dedicated to power and ground. For 0.8 micron to 1.2 micron processes, I/O delays are comparable to on-chip critical paths. Inter-chip I/O is incorporated into the pipeline, and thus does not add to the machine cycle time. ICache 30 and DCache 35 use conventional static RAMs.

Communications between the various functional units are carried out over a number of internal buses. These include: a 64-bit IFETCH_DATA bus 50 for instruction fetches; a 104-bit p-op bus 52 for communicating issued p-ops to the AP, the IEU, the MCC, and the NP; a 5-bit tag status bus 53 for communicating outstanding p-op information to the AP, the IEU, the MCC and the NP; a 32-bit physical address bus (PAdrBus) 55 for communicating physical addresses; a 64-bit (32 bits in each direction) data cache bus (DIOBus) 57 for data cache transfers; a 32-bit data exchange bus (DXBus) 58 for inter-chip exchange; a 64-bit bus for cache/memory updates; and a number of termination buses, namely an AP termination bus 60, an IEU termination bus 62, an NP termination bus 63, and an MCC termination bus 65 from the functional units to DEC 12. Some of these buses are full width and some half-width (time multiplexed). Interactions between functional units are generally limited to well defined transactions on the internal processor buses.

A number of these buses are described in more detail below. References to usage of the standard CMOS-style time-multiplexed I/O imply that the transfers occur on the boundaries between Phase 1 ($\phi$1) and Phase 2 ($\phi$2) of the system clock. A $\phi$2 transfer requires the transmitting chip to set up valid data to its I/O driver before the end of $\phi$1; valid data is provided by the I/O receiver of the receiving chip during the following $\phi$2. A $\phi$1 transfer has just the opposite timing.

Tables 1–6 show the bus formats for p-op bus 52, PAdrBus 55, DIOBus 57, DXBus 58, IEU termination bus 62, and AP termination bus 60, respectively.

Pipeline Control System Overview

Pipeline control of the processor is distributed across the functional units mentioned above. No centralized scheduling or score boarding of the pipeline is performed. DEC 12 does observe certain overall resource constraints in the architecture and will occasionally hold off on issuing a p-op which would violate resource limitations. Each functional unit is responsible for scheduling its own internal operations. Interlock checking is performed at a local level.

In a deeply pipelined machine, exception detection at various stages in the pipeline creates significant control difficulties. Each stage must be careful to hold off modification of state while any other stage may yet detect an exception on a previous instruction. Special purpose control logic is common, and careful pipeline simulations must be performed.

The processor deals with this complexity using a few techniques which are simple, general, and powerful. DEC 12 issues decoded instructions (p-ops) and the functional units process addresses and operands without regard for the consequences of exceptions detected by other functional units. As noted above, each p-op is assigned a tag by DEC 12 when it is issued, and the DEC uses this tag to track the p-op.

DEC 12 is responsible for determining when execution has proceeded beyond the point of an exception. Using techniques described below, the DEC will restore the state of the machine to the point immediately preceding (fault exceptions) or following (trap exceptions) the p-op causing the exception.

As noted above, each functional unit has a termination bus back to DEC 12. Signals on these buses indicate (by tag) when p-ops have been completed and what exceptions (if any) were detected by that unit. The DEC uses this information to keep track of what p-ops are outstanding in the machine, to track resource constraints, and to decide when exception processing must be initiated.

In response to abnormal terminations, DEC 12 will back up the state of the machine to the point of the exception, and begin issuing either a different instruction stream or a sequence of micro-instructions to invoke an exception handler. The processor uses one or more of five general mechanisms to permit the machine to be backed up to a particular state as pan of DEC's response to abnormal terminations. These are issuing abort cycles, reassigning registers, using write reservation tables, using history stacks, and functional unit serialization.

Abort cycles are issued by DEC 12 when instructions which have been issued by the DEC must be flushed from the machine. During an abort cycle all functional units are provided a tag which identifies the boundary between instructions which should be allowed to complete and instructions which must be purged from the machine.

Register reassignment is used to restore the state of the general register files and the segment register file, flushing any modifications made for instructions which must be aborted. The functional units have more registers physically available than the instruction set specifies. DEC 12 maintains a set of pointers which map the programmer visible (or virtual) registers onto the physical registers. In assembling decoded instructions, the DEC will substitute the appropriate physical register numbers into the register specification fields.

When a virtual register is to be modified, the DEC will first allocate a new physical register, modify the pointer set, and use the allocated register number as a destination register. Following execution of the instruction, the old physical register still contains the original value of the virtual register, while the new physical register contains the modified value of the virtual register. To back out of the register modification, the DEC must restore the pointer set to its value prior to issue of the instruction.

As physical registers are freed up, they are placed at the end of a free list which is sufficiently long to guarantee that a physical register will not appear at the head of the free list until after its contents are no longer required. The DEC maintains a history stack of pointer values, as is described below.

Write reservation tables are used in MCC 25 to queue up data writes until it is known that the writes will not have to be aborted. The MCC receives addresses and operands on the internal data buses, matches them up by tag, and performs the irreversible write when it is safe to do so.

History stacks are used for saving and restoring miscellaneous machine state, such as the register reassignment pointers, flags register, and program counter.

For machine state which is rarely modified, the cost of a history stack of values is not justified. For these cases, the functional unit which is to perform the modification (and only that unit) halts processing, and the tag of the oldest outstanding instruction in the machine (as provided by the DEC) is examined on each cycle to determine when all older instructions in the machine have been successfully completed. At this point there is no longer any need to preserve the old value of the machine state and the functional unit makes an irreversible change to the machine state.

The distributed pipeline control scheme, combined with the ability to back out of any state modification, allows a number of performance optimizations.

Each functional unit may receive all p-ops, but deals only with p-ops which actually require processing in that unit. This is in contrast to conventional pipelines in which instructions flow through all stages in the pipeline, whether the stage has useful work to do or not.

Furthermore, each unit performs an operation as soon as all input operands are available. P-ops that are not ready for immediate execution are stored in that unit's p-op queue. When complete, the result is passed to the next stage for further processing, and the next operation is examined. A stage only stops execution when it has nothing available for execution.

This behavior allows out-of-order execution between functional units. For a memory write which has an address generate interlock, for example, the AP will not be able to compute the memory address. The IEU, however, is able to provide the data and does so immediately, after which it continues on to the next instruction. The AP's interlock does not need to create a pipeline bubble in any other pipeline stage. Later on, the IEU may be held up performing a multiply, or waiting for a memory operand. At this time, the AP has a chance to catch-up with the IEU.

From the viewpoint of a particular functional unit, this isn't a complicated concept. The functional unit makes a local decision, completely unaware that it might cause instructions to be completed out-of-order. The pipeline control mechanisms guarantee that any modifications made by an instruction executed out-of-order can be purged. The functional unit makes no special checks.

Out-of-order execution between functional units happens for free as a result of the distributed decision making within the processor. Even within a functional unit, instructions could be safely executed out of order. IEU 17 provides an example of internal out of order execution. The IEU examines the instruction at the head of it's instruction queue to see if it is ready to execute. If a data interlock prevents immediate execution, the IEU will examine the next younger instruction to see if it is ready to execute. This process can continue until an instruction is found which can execute. The IEU will only pay a data interlock penalty if there is no instruction available which is ready to execute.

Note that even if the IEU pays an interlock penalty, that doesn't mean that the processor as a whole loses a cycle. The IEU may have been running ahead of other functional units at the time. Even if the IEU falls behind, it may be able to catch up later when an instruction is issued which does not require the IEU. Finally, the penalty cycle(s) may be overlapped with penalty cycle(s) from AP 15.

A special case of a functional unit choosing to execute instructions out-of-order is parallel execution of instructions within the functional unit In particular, this concept is applied to instructions which take multiple cycles. Parallel execution of other single cycle instructions allows the multi-cycle instruction to have an effective throughput of one cycle.

DCache misses would normally stop the pipeline for a full cache miss penalty. To the extent that the functional units can continue to find operations that can be executed without the cache clam, the cache miss penalty is reduced. The same is true for misses in the AP chip's TLB. These cases are different from the others in that the number of penalty cycles is usually fairly high, making it difficult to fully overlap them with useful work.

Pseudo-Op Bus Format

Table 1 shows the format of p-op bus 52. The bus is a 52-bit wide, time-multiplexed bus. DEC 12 alone drives this bus to issue p-ops to AP, IEU, and NP. The bus uses the standard CMOS-style time-multiplexed I/O.

Typically, one 386/387 macro-instruction is transformed by DEC to one p-op issued to the relevant functional units. In some cases one macro-instruction will result in a sequence of issued p-ops. Such p-op issue sequences are atomic, i.e., the issue of p-ops for one macro-instruction is not interleaved with the issue of p-ops for another macro-instruction (or exception processing sequence).

For a typical macro-instruction one p-op contains enough information to enable all relevant functional units to perform the requisite operations for the macro-instruction. This includes specifying memory operand address calculation and segmentation, source and destination operand registers, ALU operation, operand size, operand routing, status flag modification, and p-op tag, as well as any associated displacement and/or immediate data values. NP p-ops also specify a micro-address.

Most p.-ops are transferred over the p-op bus in one clock cycle using both clock phases ($\phi 1$ and $\phi 2$). $\phi 1$ is used for transferring almost all of the control information contained in a p-op, while $\phi 2$ is used to transfer displacements and/or immediate values (along with a few sundry extra bits of control information). In certain cases of p-ops containing both a displacement and an immediate value, which cannot be packed together in 52 bits, a second clock cycle is used to transfer the immediate value. This second cycle always immediately follows the first clock cycle. The displacement is transferred on the first $\phi 2$ and the immediate value on the second DEC 12 drives the p-op bus during all clock cycles. Usually this will be a normal p-op, but during cycles in which DEC is not ready or able to issue a normal p-op, DEC instead sends out a null p-op.

The philosophy of encoding information in a p-op is foremost based on providing control information as early as possible in a clock cycle and in an unencoded or quickly decodable form. This is particularly true with respect to initiating speed critical operations in each functional unit, and with respect to extracting displacement and immediate values and deriving the appropriate address and data operands. Only less critical control information is transferred during $\phi 2$ while generally the intention is that during $\phi 2$ each functional unit is assembling/fetching operands both from registers and from the p-op; on the following $\phi 1$ each functional unit should be able start internal calculations and the like.

As noted above, most macro-instructions are convened to a single p-op; this includes some of the more complex macro-instructions for which the complexity must be dealt with via microcode in one of the functional units (e.g. multiply in IEU, POPA in AP). Where possible though, complex macro-instructions are convened to p-op sequences which are independently executed by the functional units without awareness of the overall sequence. In some cases a p-op sequence is inherently necessary due to the amount or nature of control information that needs to be communicated, e.g. multiple register reassignments (of which only one per p-op is allowed), multiple p-op tags required by AP for proper memory request generation, or multiple register and status flag updates by AP to IEU.

For some complex macro-instructions a combination of the above can also occur, namely a sequence of p-ops is issued and one of the functional units goes into microcode to execute a core part or all of a macro-instruction in conjunction with following p-ops. For example, the first p-op of a sequence is handled by AP and IEU and additionally AP goes into microcode to perform further operations. These further operations correspond to the following p-ops that are issued. Conceptually the p-ops of the sequence are independently executed by the functional units, and in this case this is literally true for IEU. Due to the nature of the macro-instruction, though, AP needs to have a global awareness of the p-op sequence. Consequently, in this case, AP goes into microcode and simply sync's with the following p-ops. By external appearances AP is independently executing and terminating each p-op while internally AP only uses the p-op tag and one or two other fields of each p-op.

There are two additional notes of a general nature to be made regarding the issuing and recognition of p-ops by the functional units. First, most p-ops are not queued by all functional units into their respective p-op input queues. As a result each functional unit will not see, deal with, or spend time on all p-ops. In the general case a p-op is recognized by AP and IEU or by AP and NP. Some p-ops need to only be seen by AP, and one or two are recognized by all three functional units. Only AP sees all p-ops.

Second, when there is some; reason for DEC to enter exception processing, it will do so and begin issuing the associated p-ops even while there are still outstanding preceding p-ops which may require aborting the more recent exception processing related p-ops. In general DEC performs the minimum necessary self-restraint in issuing p-ops so as to insure proper operation from a macro-instruction viewpoint.

The relevant point is that from a microscopic viewpoint (i.e. at the level of individual p-ops) there are very few apparent constraints on the p-op sequences that can be issued by DEC or on the timing of their issue, and thus few assumptions that can be made by functional units. This statement also particularly applies to the fact that few assumptions can be made regarding the abort/on of p-ops. Only the most basic of constraints are apparent, such as the maximum overall number of outstanding p-ops allowed and maximum number of outstanding NP p-ops allowed, and the guarantees about what p-op tags can be active/outstanding at any instant.

With regard to ensuring proper macroscopic instruction execution, there is one aspect worth briefly mentioning. Some p-ops modify programmer visible state for which the F86 micro-architecture does not support the ability to back out of after modification by the p-op. Conceptually this requires some degree of quiescing the functional units so DEC can ensure that the p-op is to permanently be executed before it is executed at all. This is not done in the gross manner of DEC holding up issue of the p-op (and all following p-ops) until all the functional units have reached a quiescent state. Instead quiescing is done on a localized (functional unit) basis only by each of the units for which quiescing is necessary for the given p-op. DEC is able to issue this and following p-ops while the necessary degree of quiescing is performed by the relevant functional units. Further, units not involved in the quiescing can fully continue to execute the following p-ops.

DEC Overview, Pseudo-Op Tracking, and Issue Control

As each pseudo-op (p-op) is issued by the DEC over the P-Op Bus, it is queued by the appropriate functional units (AP, IEU, NP). Each functional unit then processes its p-op stream in loosely coupled manner with respect to other units, and signals a termination to DEC 12 as each p-op is completed. FIG. 2 is a block diagram of DEC 12, which comprises a Frontend 100, a Decoder 102, and a Backend 105. FIG. 3A shows the DEC Frontend, FIG. 3B shows the DEC Decoder, and FIG. 3C shows the DEC Backend.

DEC Frontend 100 is responsible for fetching and supplying instruction bytes to the Decoder. Instructions are supplied either from BPC 13 or one of three instruction buffers fed by IFETCH_DATA bus 50. Instruction bytes are supplied (24 bytes at a time) to rotate/shift logic 110 which aligns the instruction on the basis of information from a PC (program counter) register 112. Eight bytes are provided to Decoder 102, which determines the instruction length and communicates it to PC logic 112. In the event that the instruction is longer than 8 bytes, 8 bytes are communicated in one cycle and up to 8 instruction bytes on the next.

Frontend control logic 115 controls a stream stack 117, and provides stream addresses to ITag 27. There may be up to two outstanding branches and therefore up to three outstanding streams. The control logic issues instruction requests to instruction stream address registers 31 in ITag 30 specifying what stream to fetch, and receives valid bits qualifying the stream. When the ITag provides an address, it increments the appropriate address register. Control logic 115 also receives signals from PAdrBus monitoring logic 120, which detects writes into the instruction stream for self-modifying code.

DEC Decoder 102 is responsible for decoding macro-instructions and issuing all p-op sequences over p-op bus 52. The Decoder receives instruction bytes (macro-instructions) from Frontend 100, which are loaded into an instruction register 130. The macro-instruction is decoded by decode logic 132, p-op type decode logic 135 transmits information regarding the p-op type to the Frontend and Backend while instruction length decode logic 137 communicates with PC logic 112 in the Frontend.

Decoder p-op assembly logic 140 receives p-ops from decode logic 132 and modifies them according to register assignment information from the Backend. The p-ops are loaded into a p-op output queue 142 whence they are driven onto p-op bus 52. Issuance is held up by issue hold logic 145 based on control signals from the Backend.

Decoder 102 contains a sequencer 147 to control issuance where multiple p-ops arise out of a single macro-instruction. Decode hold logic 150 prevents processing where no valid instruction bytes are incoming from the Frontend. Associated with issuing the p-op, Decoder 102 assigns a tag. Although the tags are issued in a cyclical sequence, and are therefore reused, at any given time only one p-op is associated with that tag. The range of tags must be sufficiently great relative to the number of p-ops that are allowed to be outstanding so that relative age can be determined. A range of at least twice the maximum number of outstanding p-op allows such a determination by simple subtraction.

Backend 105 keeps track of all outstanding p-ops as they float around through the CPU. It is necessary to appropriately control the issue of p-ops so as to ensure reliable operation (in the context of the CPU's tagging scheme to control p-op, address, and data processing); and to arbitrate over abnormal conditions signaled by functional unit terminations, and then initiate appropriate actions. As the Decoder issues a p-op it also passes along information about the p-op to the Backend. This is used to identify the correct actions necessary to perform the above tasks.

The Backend includes tracking logic 160 to keep track of all outstanding p-ops, and hold condition logic 165, responsive to the outstanding p-ops, to control the issue of subsequent p-ops by Decoder 102 so as to continuously satisfy a variety of constraints (to be discussed below) which are required for correct, reliable CPU operation. Tracking logic 160 provides information for tag status bus 53, including the tag of the oldest outstanding p-op (OOTag). The Backend also includes abort logic 170 to handle aborting of p-ops, register reassignment logic 175 which maintains a pointer set array 177 and a free list array 178, to be discussed in detail below, and tag generation logic 179 to control tag status bus 53.

Backend termination bus logic 180 receives termination information from each of the functional units, making it possible for tracking logic 160 and abort logic 170 to maintain the status of each outstanding p-op. Some are accumulated until some future point in time. During normal operation this tracking primarily influences the issue of following p-ops. But, to the extent that abnormalities are signaled by the functional units via corresponding terminations, the Backend resolves multiple abnormal terminations of any given p-op, and then initiates the appropriate response. This can include sending an abort cycle out to all the other functional units (including also MCC) so as to back up the state of the CPU to some prior state of p-op processing.

Tracking logic 160 and abort logic 170 include registers for storing particular information concerning all outstanding p-ops. The registers are organized as eight identical register sets, numbered 0–7 corresponding to the three least significant bits of the tags of outstanding p-ops. Since at most seven p-ops can be outstanding, and since tags are issued sequentially, relative age can be determined on the basis of position number. Tracking logic 160 includes eight each of state registers 190, termination registers 192, and p-op information registers 193, with associated logic. Abort logic 170 contains eight each of response selection registers 195, priority logic registers 197, and termination storage registers 198, with associated logic.

Each state register 190 stores a single state bit that is set if a p-op having a tag corresponding to that position is outstanding. Each termination register 192 stores one termination bit per functional unit; the bit is set when the functional unit terminates the p-op, or if there is no action required by that functional unit with respect to the p-op.

Each p-op information register 193 stores eight bits relating to the associated p-op. These include the most significant bit of the p-op's tag, which functional units operate on the p-op, the type of p-op (e.g., floating point, branch), branch prediction information, and an abort group bit. The abort group bit, when set, signifies that the p-op is the final member of an abort group. Thus, a "0" signifies that the p-op is not the final member, and therefore cannot retire alone, while a signifies that the p-op cannot be aborted without aborting adjacent older p-ops with "0" in their abort group bits.

The collection of state bits allows an identification of the oldest outstanding p-op. The p-op's position provides the three least significant bits of the tag, and the information register provides the most significant bit. The state bit and bits in p-op information register 193 allow hold condition computation logic 165 to determine hold conditions, as will be discussed below.

Each response selection register 195 provide information for the Frontend as to what response is necessary. Each priority logic register 197 specifies the appropriate action to be taken in response to multiple abnormal terminations on a given p-op. Each termination storage register 198 maintains detailed termination information from the functional units operating on the associated pop, including the particulars of any abnormal termination.

For the most pan, the functional units are not concerned with the status of outstanding p-ops, except when an abort occurs. The primary exception to this is MCC 25 which needs to know when it is safe to actually perform memory and I/O writes into the cache and/or out to the rest of the system. In special cases the AP and IEU also need to know when it is safe to execute certain p-ops. All these needs are satisfied by the Backend through the continual issue every clock cycle of information over tag status bus 53, which reflects the OOTag and signals aborts.

Tag Status Bus

Tag status bus 53 is a 5-bit bus whose signals are only defined on $\phi 1$. When bit $<5>$ is 0, which is the case for most cycles, bits $<4\ldots 0>$ indicate OOTag, the tag of the oldest outstanding p-op. When bit $<5>$ is 1, an abort is indicated, and bits $<4\ldots 0>$ indicate the tag of a p-op to abort back to. This is called an abort tag (ATag). During an abort cycle Backend 105 overrides the Decoder's issue of its next p-op and forces the issue of one of two types of null p-ops.

When the tag status bus indicates the p-op with tag=i is the oldest outstanding p-op this means that all older p-ops (i.e. with tag<i based on 4-bit two's complement arithmetic) are no longer outstanding and are considered retired. All younger issued p-ops, including p-op(i), (i.e., p-ops with tag>i), are outstanding. This of course excludes p-ops issued and subsequently aborted.

A p-op's being considered as outstanding means that it is still abortable, and this is in fact the operative definition used by Backend 105 in deciding when to retire p-ops. It generally retires p-ops as soon as possible after they have been completed by all necessary functional units (based on their terminations). There are a variety of constraints, though, which affect when p-ops may actually be retired. Some details of this are described below.

When the oldest outstanding p-op is retired the tag status bus will reflect this by advancing from indicating OOTag=i to OOtag=i+1. Each and every clock cycle the oldest outstanding tag may advance. It is also possible for an advance to jump from OOTag=i to OOTag=i+n (where $1 \leq n \leq 7$), effectively retiring several p-ops in one clock cycle. If there are no outstanding p-ops the tag status bus will indicate the next tag to be issued as the oldest outstanding.

An abort to p-op with tag=i (p-op(i)) means that all p-ops with tag$\geq$i (based on 4-bit signed two's complement arithmetic) should be flushed and the state of the CPU rolled back to the state as it existed between p-op(i-1) and p-op(i). This includes the next p-op tag to be issued. In other words the abort should flush p-op(i) and all younger p-ops and restore the CPU to a state where these p-ops were apparently never issued.

An abort to tag=i can occur at any time, and is not necessarily delayed until p-op(i) is the oldest outstanding p-op. Also, such an abort may occur when no p-ops with tag>i exist; it is still guaranteed, though, that the abort tag and the tags of all outstanding p-ops are such that all tag comparisons for relative age are still reliable. (As a side note: if, for example, there are seven outstanding p-ops and this case occurs, then the abort tag must be one greater than the tag of the seventh (i.e. youngest) p-op.)

This flushing and rolling back of state must be performed by each functional unit during (roughly) the cycle that the abort is signaled. This is necessary since Decoder 102 may start issuing new p-ops the very next clock cycle. This is particularly true in association with transfer-of-control macro-instructions whose direction or type (for far transfer controls) is mispredicted.

In summary, each functional unit must clean itself up in one cycle and return to a normal state of processing by the end of that cycle.

In general, during the cycle following an abort cycle either another abort cycle can occur, a p-op can be issued (with more on subsequent cycles), or a simple null p-op can be issued (because the Decoder does not yet have the next p-op ready to issue). Following an abort cycle, assuming the next cycle is not another abort cycle, the, p-op tag indicated as oldest outstanding may be the same as it was prior to the abort cycle, or may have advanced some number of tags up to as far as the tag that was aborted back to. This last case would occur when, after the abort, all preceding (older) p-ops are retired and of course all younger outstanding p-ops no longer exist.

Tag Issue

The following discussion relates to p-op tags, a summary of what they are and how DEC 12 issues them. All tags originate from DEC through being pan of all issued p-ops. Each p-op tag is then used by functional units to tag addresses and data associated with each p-op. Given that up to seven outstanding p-ops are allowed, at least a 3-bit tag is required. This is extended with one more significant bit to create a 4-bit tag which simplifies the comparison of p-op tags for relative age. Specifically, with tags assigned in the manner described below, a 4-bit two's complement signed comparison reliably indicates the relative age of two tags. Note that, at any point in time, only the three least significant bits are necessary to unambiguously identify p-ops.

Relative to the order of macro-instructions, all p-ops stemming from such instructions are issued in order, tags are also assigned in order. All sixteen tag values are considered valid tags, with tag order defined as next_tag:=(current_tag+1) mod 16. Consequently, the above comparison for relative age reliably works.

During instruction processing without aborts the above is straightforward. When an abort occurs back to tag=i, and CPU state is rolled back to just before p-op(i), tag assignment is also reset back to tag=i. To continue to ensure the reliability of relative age comparison, DEC must issue new p-ops from this point starting with tag=i. Effectively, the tags of p-ops which were aborted are reissued with the new p-ops. This means, for example, that an abort back to a point earlier than a prior abort has the same effect as if only the second abort had occurred.

More generally, a virtually unlimited set of scenarios, with regard to abort cycles and p-op tag issue, can occur. For example: p-ops(3-7) are outstanding, then abort to p-op(5), issue tags 5-8, abort to p-op(6), abort to p-op(4), issue tags 4-5, abort to p-op(3), issue more p-ops, etc. Although this scenario may or may not be possible, given CPU operation and DEC functional behavior, the point is that very little past the above tag issue behavior should be assumed about the relationship between issuance and abortion of p-ops. As explained in the previous subsection, with each abort each functional unit should just clean up quickly, get back into a normal state of operation, and forget about the abort.

Pseudo-Op Retirement

As p-ops are processed by each functional unit, terminations are signaled to DEC on the units' termination buses, indicating the completion of the p-op by the functional unit. These are monitored and tracked by the Backend to control when p-ops are retired. Though there may be special-case internal reasons why the Backend may delay the retirement of a p-op, generally there are two issues which govern when a p-op is retired: ensuring proper CPU behavior in normal circumstances and ensuring proper abortability of macro-instructions (and also exception processing sequences).

Most fundamentally a p-op cannot be retired until all concerned functional units have signaled a (generally normal) termination of the p-op. As the Decoder of DEC issues a p-op, it also passes information to the Backend about the type of p-op. This includes the functional units which will be processing the p-op and thus which to expect a termination from, Based on this information, the Backend will retire a p-op as soon as possible after it has been fully terminated, i.e., completed, subject to any other constraints.

For single and short p-op sequence macro-instructions the DEC must handle aborting the entire instruction (i.e. all its p-ops) if a fault exception is detected on any of the p-ops. This requires that the Backend not retire any of the p-ops until all of them have completed (with normal terminations), Once they all have successfully completed, they will all simultaneously be retired, Note that for p-op sequences which approach the limit of maximum seven p-ops outstanding, this approach to instruction abort becomes undesirable, For example, assuming a seven p-op sequence for an instruction, a DEC quiesce effectively occurs after the seventh p-op is issued while DEC waits to receive full termination on all seven p-ops before issuing any more p-ops. For p-op sequences which are longer than seven p-ops in length a different approach is absolutely necessary in supporting proper instruction abort.

In some casts this can be handled through a combination of allowing certain memory writes by the instruction to actually occur anyway, In some casts it is also possible/acceptable to use one or more extra p-ops at the beginning of the p-op sequence to do certain extra checks which will detect any exception faults that would otherwise not be detected until one of the later p-ops in the sequence. The intention is that between these extra up-front checks plus checks done by the first p-op (or so) of the real p-op sequence, only one of these early p-ops can lead to an instruction abort; all the later p-ops are then guaranteed to execute without exception fault.

With these approaches to supporting instruction abort, only the early p-ops need to be held outstanding until they have all successfully completed. Specifically it is indicated with such sequences that only the first so many p-ops of the sequence need to be handled in this manner by DEC (namely by the Backend), and that the rest of the p-ops are not so constrained. Inside DEC information to this effect is passed from the Decoder to the Backend as each p-op is issued. In many cases where extra up-front p-ops, in combination with just the first p-op of the real sequence, are sufficient to catch all exception faults, it is alright to allow even the early p-ops to be retired as soon as they are each completed. This would be acceptable if the extra p-ops don't significantly affect backing out of the instruction (i.e. they don't modify programmer-visible state).

The last general consideration in retiring p-ops is that, even though all the p-ops of a sequence for a macro-instruction may have completed, if an earlier p-op has not yet completed, then the completed, later p-ops cannot be re, tired. This is essentially another way to view the fact that p-ops must be retired in order. Once the older p-op completes and can be retired, though, both it and these later p-ops will all be retired simultaneously.

Table 7 illustrates a sequence of tag issuances and terminations. Four points in the sequence, designated A, B, C and D are indicated and define the boundaries of four intervals. FIGS. 4A–D illustrate the information that is stored in the registers of tracking logic 160 and abort logic 170 at sequence points A–D, respectively. Single p-ops or groups of p-ops are designated as belonging to abort groups. An abort group consists of one or more p-ops that must all complete for any to complete. Put another way, if it is necessary to abort one of the p-ops in the abort group, it is necessary to abort all the p-ops in the abort group.

During the first interval p-ops(3,4,5) are issued with p-ops(4,5) belonging to an abort group (AG). FIG. 4A shows the information that is in the tracking and abort logic registers. More particularly, as the p-ops are issued, p-op information is stored in locations corresponding to the tap numbers, the state registers for p-ops(3,4,5) are set, designating the p-ops as having been issued. The abort bits for p-ops(3,5) are set, indicating that p-ops(4,5) belong to an abort group while p-op(3) is the sole member of an abort group.

During the second interval p-op(6) is issued and AP signifies a normal termination of p-op(3). As can be seen in FIG. 4B, the state bit for p-op(6) is set in state register 190(6), the AP termination bit for p-op(3) is set in termination register 192(3), and the normal AP termination is written into termination storage register 198(3).

During the third interval, p-ops(7,8,9) are issued, with p-ops(7,8) belonging to an abort group. During this interval, IEU indicates that p-op(3) terminated normally, AP indicates that p-op(4) terminated normally, and IEU indicates that p-op(6) terminated normally. FIG. 4C shows that state bits for p-ops(7,8,9) are set in state registers 190(7), 190(0), and 190(1), the IEU termination bits are set in termination registers 192(3) and 192(6), and the AP termination bit is set in termination register 192(4). Corresponding normal terminations are written into termination storage registers 198(3), 198(6), and 198(4). Also note that p-op(3) was allowed to retire, whereupon the state bit in state register 190(3) is negated.

During the fourth interval, no additional p-ops are issued since there are seven outstanding p-ops, which is the maximum number allowed to be outstanding. During this interval, the AP indicates that p-ops(5,6,7) have terminated normally and IEU indicates that p-ops(4,5,9) have terminated normally. However, AP then indicates that p-op(8) has terminated abnormally (for example, a page fault), after which IEU indicates that p-op(7) has terminated normally. The result is that p-ops(4,5,6) can be retired, whereupon they are no longer indicated as outstanding p-ops. However, the abnormal termination of p-op(8) requires that p-op(7), which is a member of p-op(8)'s abort group, and p-op(9), which was is,sued after p-op(8), must also be aborted. Thus, abort logic 170 issues an ATag of 7 to be sent out on the tag status bus to signify to the functional units (in this case AP and IEU) that they must back up as if p-ops(7,8,9) had not been issued.

Pseudo-Op Issue Constraints

As the Backend tracks outstanding p-ops and each functional unit's p-op terminations, hold condition logic 165 in the Backend also uses the status of outstanding p-ops to control the issue of additional p-ops. To ensure correct overall CPU operation and functioning of specific blocks of logic in specific functional units (particularly DEC, AP, and NP), the Backend continuously imposes a variety of constraints about the maximum number of various types of outstanding p-ops. As the limits imposed by these constraints are reached during operation, the Backend generates hold condition signals to the Decoder to control whether the p-op to be issued the next cycle must be delayed.

The Backend generates roughly half a dozen hold condition signals to the Decoder to potentially hold up the next p-op. The Decoder uses these signals to produce the actual p-op decode/issue hold based on the p-op currently being decoded/assembled and whether signaled hold conditions apply to it. Each hold condition corresponds to one or more (similar) constraints. For a given constraint, when the Backend determines that the maximum number are outstanding and that one of these p-ops was not just fully terminated, the corresponding hold condition signal will be asserted.

For many constraints it is guaranteed that the oldest outstanding p-op of the relevant type will be the first one to be fully terminated. Also, for some constraints the hold condition is based on outstanding, not hilly terminated p-ops, instead of being based on simply an outstanding (i.e., not retired) p-ops. Once a p-op is fully terminated, even though it may remain outstanding for several more cycles, it is no longer relevant to some of the constraints associated with hardware limitations of specific functional units.

While the Backend is one of the principal generators of hold conditions to the Decoder, there are several other sources of hold conditions. Such a hold condition signals a limitation which may or may not apply to the current p-op about to be issued. To be completely general about p-op issue control it can be stated that each clock cycle the Pseudo-Op Bus is driven with either a valid p-op or a null p-op, the latter possibly in conjunction with an abort action. From the Decoder's viewpoint it will always issue a valid p-op unless any of the following occur:

1) Abort override from Backend;
2) Hold from the Backend;
3) Hold from the BPC;
4) Hold from the VIB (virtual instruction buffer);
5) Decoded only prefixes; and
6) Sending 2nd half of a 2-cycle p-op Of these, nos. 5 and 6 are generated by the Decoder, and nos. 4 and 5 are only applicable to the first p-ops of macro-instruction sequences.

"Hold from the BPC" occurs when the Decoder is attempting to decode the next macro-instruction and finds a transfer-of-control instruction which may be cached in the BPC. (Some types of transfer control instructions will not be cached.) For such an instruction the Decoder at least needs an attempted BPC access to the prediction information of an entry (versus the entry's target stream). The BPC access for this transfer-of-control instruction occurs during the decoding of the instruction; if this BPC access cycle wasn't available for the Decoder, a BPC hold is generated. If access was available to the BPC for prediction information and a miss occurs, the Decoder can proceed accordingly even though BPC target stream access was not available. If a hit occurs and access to both parts of the BPC was not available, then a BPC hold will be generated; otherwise the Decoder can proceed with the prediction information while the BPC entry's target stream is dumped into the new instruction queue allocated for this transfer control instruction.

"Hold from the VIB" occurs when the Decoder is attempting to decode the next macro-instruction but has not received all required instruction bytes (with respect to the instruction length). The Decoder, past any detected valid prefix bytes, must have at least a valid opcode byte or a VIB hold is forced. If a mod r/m byte is required, based on preliminary decode of the opcode byte, then this must also be present or a VIB hold is again forced. Further, if an s-i-b byte is required, based on preliminary decode of a rood r/m byte, then the same also applies for the s-i-b byte. Given the validity of these bytes, the final instruction byte (actually the VIB word containing it) is checked (and implicitly also all intermediate bytes)—if it is not valid (i.e. "Bad" or Empty") a VIB hold is generated.

"Decoded only prefixes" occurs when the Decoder is attempting to decode the next macro-instruction but it has thus far only decoded prefixes, and currently has decoded two more prefixes. The case of one prefix and a second Empty byte may be treated either as a "Hold from the VIB" until the second byte becomes non-Empty, or as a "Decoded only prefixes" with the one prefix byte being consumed and the VIB advanced.

"Sending 2nd half . . . " occurs when the Decoder just issued the first cycle of a 2-cycle p-op. During this cycle a special null p-op is sent with the additional p-op information while the decode and generation of the next p-op is delayed.

"Hold from the Backend" occurs when, for the type of p-op about to be issued, the Decoder realizes, based on the Backend's signals, that-it is not "safe" to issue the p-op immediately. The following lists all the outstanding p-op constraints enforced by the Backend:
1) 7 total p-ops;
2) 2 transfer-of-control p-ops;
3) 1 abort group of p-ops in single-stepping mode;
4) 2 p-ops with segment register reassignments; and
5) 0 more 1st p-ops after a DECquiesce p-op.

The maximum of 7 total outstanding p-ops applies to all unretired p-ops. In general, and thus for this constraint, p-ops are not fully terminated in order. The Backend, though, may only retire p-ops in order.

The maximum of 2 outstanding transfer-of-control p-ops applies to all such p-ops, though more correctly the constraint is actually on transfer-of-control macro-instructions and the 1st p-ops of their p-op sequences. For this constraint transfer-of-control p-ops are counted only while they are outstanding and not fully terminated. When such a p-op is fully terminated, but not yet retired, it is no longer significant with regards to hardware limitations. Depending on when instruction fetch page cross requests are generated and how they are handled, the Backend may signal this hold condition even though two transfer control p-ops are not outstanding. But for all cases of there being outstanding instruction fetch doubleword requests for relatively old sequential instruction streams there is no impact with respect to this Constraint. Note that IEU is required to terminate transfer-of-control p-ops (ones involving IEU) in order.

When p-op single-stepping h enabled (for hardware debug purposes), p-ops are issued one abort group at a time, fully terminated, and retired before the next one is issued.

Due to the reassignment scheme used for segment registers there can only be two outstanding p-ops which contain segment register reassignments for the data segment registers (i.e. DS, ES, FS, GS). P-ops which only read a segment register or which store into CS and/or SS do not apply towards this constraint, the purpose of which is to ensure abortability past any and all segment register store p-ops. It is not necessary to include stores to CS and SS since APquiesce behavior is applied to CS/SS store p-ops already.

When a DECquiesce p-op is issued, the Decoder may continue to issue further p-ops in a sequence, but must hold up decoding the next macro-instruction until certain updated control bit information has been received by the Backend from AP. These control bits are various bits of EFlags which affect the Decoder's macro-instruction decoding and p-op assembly process. A p-op which can result in one or more of the EFlags bits' being modified, that the Decoder is dependent on, must be treated as a DECquiesce p-op. This ensures that DEC's copy of these bits is updated before further macro-instruction decode occurs. Until the expected update is received from AP, the Backend will generate a hold condition to inhibit further macro-instruction decode and 1st p-op issue.

With the exception of an Abort override, all Decoder hold conditions are determined early enough to enable the Decoder to determine its next state of operation by the time the next decode cycle must start (specifically in time to set up the control, etc. to advance the currently active instruction queue, to access the newly active queue and produce new VIB contents, and to perform pre-decode). An abort override is not, and need not be, generated until later since the p-op generated by the Decoder will be discarded and replaced by a null p-op. Simultaneously the Decoder will be jammed and vectored by the Backend to a new p-op sequence to be generated. (Note: there is more than one type of jam and vector with respect to timing and the vector destination.)

As explained above, for normal hold conditions signaled by the various (DEC internal) units the Decoder interacts with, the Decoder does not receive actual hold signals from each unit. Instead each unit sends hold condition signals which are combined (ANDed) with state signals reflecting the type of p-op being generated, to produce actual hold signals. These, along with additional hold's generated by the Decoder, are combined (ORed) together to produce an overall Decoder Hold which not only controls the p-op issue and Decoder state sequencing, but also is sent to the other units to affect their state sequencing insofar as their interactions with the Decoder.

Functional Unit Quiescing

As functional units process p-ops, they must ensure the ability to abort or back out of modifications to most programmer-visible and related state. This includes all commonly modified, performance-critical state: general purpose registers, floating point registers, and most segment registers, PC's, and status flags. Other things, i.e., special state that is seldom modified, are not backed up via a history stack or using register reassignment. These are instead handled by limiting when they can be modified by the owning functional unit(s). This process is termed quiescing.

Essentially, for a given special register, the owner(s) delays performing the modification until the associated p-op is the oldest outstanding p-op. At this point there is no possibility of the p-op being aborted due to another (earlier) p-op. Further, any possible reasons stemming from this p-op which would lead to its being aborted have presumably already been checked. Thus, it is now considered safe to perform the modification. (If the owning/modifying functional unit can subsequently detect a reason for backing out of the p-op, it must do whatever is necessary so as to be able to undo the modification.)

If a p-op is processed by other functional units besides AP and requires this kind of handling, only the owning functional unit is able to signal an abnormal termination. All such p-ops are defined/written such that the other functional units will always signal a normal termination. If two functional units both own a special register, they will each modify their own copy and the p-op will be such that both units will always signal a normal termination.

In any given case only the functional units which are dependent on the special state to be modified by a p-op are involved with quiescing. All other functional units which process the p-op will behave normally. In essence quiescing of a p-op occurs on a localized basis and only where necessary. As much of the CPU as is possible continues normal processing while only the p-op processing by the quiescing functional unit(s) is possibly slowed down.

Insofar as AP owns most special registers, most quiescing p-ops require quiescing by AP only. Many of these are AP only p-ops, while the rest are AP/IEU p-ops. Quiesces by NP (all on AP/NP p-ops) are for modifications to the three control registers it possesses. The case of a dual functional unit quiesce is presently limited to AP and IEU. This occurs when a p-op modifies the Direction Flag of the EFlags register. Since AP and IEU both maintain up-to-date copies, AP and IEU perform parallel but independent quiesces.

Even though a functional unit quiesces when processing a given p-op, this does not necessarily mean that the unit quiesce right before beginning processing of the p-op. Particularly in the case of AP quiesces it is possible for part of the processing of the p-op to be performed before quiescing. It is only necessary for AP to quiesce at the point where the special register is to be modified. After quiescing is completed AP can perform the modification and continue processing.

DEC can also perform a quiesce, but this is only somewhat similar to the quiescing performed by other functional units. Following the issue of a DECquiesce p-op, DEC delays the assembly and issue of certain p-ops. This delay occurs until a Control Bit Update is received by DEC from AP. For further explanation of DEC quiescing see the previous sub-section. For description of Control Bit Update see the section below describing the AP termination bus.

In DEC quiesce cases, as well as in other cases in which DEC receives a Control Bit Update from AP, DEC copies of certain special control bits are updated. This occurs in conjunction with modification by AP of its own copy of these control bits. The copies held by DEC are not viewed as master copies owned by DEC, but instead as secondary copies maintained in DEC by AP. DEC does not possess the ability to back out of updates to these control bits. This is not a problem, though, since AP must also modify its master copy of these bits and it will not send Control Bit Update before modifying its own copy. This requires an APquiesce and thus the update of DEC's control bit copies will effectively be delayed by AP until the associated p-op is oldest outstanding.

Abnormal Termination Handling

As described above, the Backend monitors each functional unit's terminations of p-ops and accumulates status about all outstanding p-ops. Based on this information the Backend controls the retirement of p-ops (generally after having been normally terminated by all concerned units, versus abnormally terminated) and influences when new p-ops are issued by the Decoder. When p-ops are completed and have received one or more abnormal terminations, the Backend is also responsible for determining the appropriate response and then initiating it at the appropriate time.

As the Backend receives terminations for a given p-op, including abnormal terminations, it generally just accumulates them until all expected terminations have been received. Then, if there were any abnormal terminations the p-op will not be allowed to retire. At this time the Backend will then initiate the appropriate response. If there were multiple abnormal terminations the Backend will also prioritize and select the abnormal termination to respond to. Both of these aspects of abnormal termination handling are discussed below.

This waiting before initiating a response is done to minimize the design complications of handing interaction cases stemming from abnormal termination responses being nested/superseded by earlier/older p-op abnormal termination responses which are detected and initiated later. Also, given that only abnormal termination cases which result in the initiation exception processing are handled this way, there is no significant performance penalty for waiting.

The specific response initiated by the Backend is dependent on the abnormal termination in question and on whether older p-ops are outstanding. It is not explicitly dependent on the p-op in question, and particularly not explicitly on the opcode of the p-op. Often the response will include sending out an abort cycle with an appropriate tag (which isn't necessarily the tag of the abnormally terminated p-op). During the abort cycle, or during a cycle with a null p-op being issued without a concurrent abort, the Backend will jam and vector the Decoder to a state from which it will continue decode and p-op issue operation. For cases where exception processing must be initiated, the Decoder is vectored to an appropriate p-op sequence which it will assemble and issue before returning to macro-instruction processing. Depending on the type of exception being initiated, the abnormally terminated p-op may be included in an abort or may be retired in a normal fashion.

For most cases in which the abnormal termination to be responded to does not result in exception processing, there is immediate response initiation once the p-op is fully terminated. For a few special abnormal terminations a response occurs immediately after the termination is received by the Backend. These terminations are not considered normal terminations but are more of an informative nature. Further, these terminations are not true terminations in that a subsequent termination is still expected and required from the functional unit generating the special abnormal termination.

The responses for these cases are similar to those above which involve initiating exception processing, and also include the possibility of not only vectoring to some appropriate p-op sequence, but also instead vectoring back to the macro-instruction stream. In other words, the later p-ops in a p-op sequence would be aborted and the Decoder would then continue decoding the macro-instruction stream starting with the next instruction (from the current or a different instruction queue). Also, for a few of the abnormal terminations the response may not directly affect the Decoder and/or would involve other actions internal to DEC being initiated.

IEU Termination Bus

Table 5 shows the format of 5-bit IEU termination bus 62. The bus uses the standard CMOS-style time-multiplexed I/O, and signals normal terminations of p-ops and two types of abnormal terminations (exceptions and mispredicted branch directions). On $\phi 2$ the bus provides a 3-bit p-op Tag and a 2-bit Termination Id.

Due to the timing of DEC's decode and p-op assembly pipeline, if an IEU termination code and associated p-op tag is sent time-multiplexed on $\phi 2$-$\phi 1$ (i.e. everything one phase earlier), it is possible for DEC to respond immediately with an abort cycle followed by the correct next p-op (from the correct next macro-instruction or from the appropriate exception processing p-op sequence).

In general IEU may and will terminate p-ops out-of-order (with respect to order of issue by DEC). There are certain p-op specific cases where relative serialization between two p-ops of the same type must be maintained by IEU insofar as the order in which p-ops are processed/exited. Generally for these cases execution order is crucial, not termination order. Transfer-of-control p-ops, of which IEU only sees conditional (near) transfer-of-control p-ops, are required to be terminated in relative serial order by IEU; it is not absolutely necessary, from DEC's viewpoint, for these p-op's to be processed in order.

As IEU processes p-ops, there are two cases of when they may be terminated: 1) for p-ops not requiring a DXBus transfer after execution, the p-op may be terminated once the correct termination is known; 2) for p-ops requiring such a transfer after execution, the p-op may be terminated once it is known that the transfer is definitely about to occur or is actually occurring. In either case the termination may occur later than these points in time. In other words, for case no. 1, a p-op can be terminated during its ALU operation if the termination is unconditionally normal, or just after the ALU operation is completed if the termination is dependent on the ALU operation. For case no. 2, a p-op can be terminated once IEU knows that it won DXBus arbitration for the transfer.

Currently, based on general IEU pipeline and output queue timing and interaction, in conjunction with the timing of IEUTerm (i.e., $\phi 2$-$\phi 1$), the following actual termination behavior is expected of IEU. For p-ops not needing to transfer a result over the DXBus, the termination will start during the ALU operation cycle. For most p-ops this is unconditionally a normal termination; for transfer control p-ops the correct termination is determined during the first part of the alu cycle (this also applies to the INTO instruction p-op). Occasionally this termination, not able to go out onto the termination bus, will be queued and will be signaled to DEC later (but of course fairly soon).

For p-ops which need to transfer a result over the DXBus, the termination will start during the transfer cycle; and again, if the termination is not able to go out immediately, it will be queued and sent later.

For the p-ops associated with the BOUND and REPed string macro-instructions which fall into case no. 1, and which can result in an abnormal termination and are dependent on the ALU operation, the above timing for case no. 1 p-ops does not work. For these cases the p-ops will be treated as if they need to send a result out on the DXBus.

There are two reasons for why terminations will be generated out-of-order. First, IEU selects p-ops out-of-order to be processed/executed. Second, relative to execution order, IEU may terminate p-ops further out-of-order. Roughly speaking, IEU will terminate case no. 1 p-ops immediately while case no. 2 p-ops must first get onto the DXBus, possibly waiting in IEU's data output queue to do so. In the latter case, these p-ops will be terminated when they do actually go out onto the DXBus. Additionally, given the queueing of (temporarily) excess case 1) and case 2) terminations, there is also the possiblity of certain high-priority terminations (e.g. transfer-of-control terminations) being signaled ahead of queued terminations. (Of course the relative serialization of transfer-of-control p-ops must be ensured.)

Regardless of out-of-order termination, IEU must, in all cases, complete the processing of a p-op before terminating it. This includes p-ops which result in a register update from AP to IEU, or which simply transfer a memory operand to a register. For both types of p-ops the source operand must be received before the p-op is terminated. This is noted as contrast against AP's behavior: for various transfer and register update cases AP can terminate before receiving what effectively is a register update (even given that register result merging may be necessary).

After IEU signals an abnormal termination in response to a detected abnormality while processing a p-op, it continues processing other p-ops as if the p-op was normally terminated. IEU does not stop processing p-ops and in some manner wait for eventual response to the abnormal termination.

IEU Terminations

The following describes the terminations set out in Table 5.

No Termination must be signaled whenever there is not a real termination to signal. The termination bus is valid every clock cycle and must always indicate something.

Normal Termination is signaled when no abnormalities are realized during the processing of a p-op.

Mispredicted Branch Direction Termination is signaled on transfer-of-control p-ops (which must be conditional near control transfers) when the predicted branch direction is incorrect. This is in place of a normal termination for a correctly predicted branch direction.

The abnormal terminations are for exception reasons, each being used to signal the corresponding architecturally defined exception. Divide error is used on the p-ops annotated with EUabort in the p-op sequences for DIV and IDIV macro-instructions. Bounds Check and INTO Overflow are used on the EUabort p-ops for the BOUND and INTO instructions respectively. REPed Instruction Iteration Stop Termination is signaled on the p-ops of p-op sequences for REP'ed string macro-instructions, specifically on the p-ops which are annotated with EUabort. If the test performed by the p-op indicates that iteration of the string macro-instruction should stop, this termination is signaled in place of a normal termination. This also applies if the p-op test indicates that iterations of the string instruction should not even start (i.e. perform zero iterations). If no exception is detected in these situations, a normal termination is signaled.

Though there is no possibility of the IEU's detecting multiple abnormalities on one p-op, and thus there is no issue of relative priority between IEU's abnormal terminations, there is a priority issue with respect to other functional units' terminations. Since there can only be one type of exception for a given p-op type in the IEU, DEC's abort logic can uniquely identify the type of exception based on the p-op. IEU abnormal terminations are grouped into several groups based on their priority in being recognized by DEC relative to AP and NP abnormal terminations. Most of the abnormal terminations are grouped in a medium priority group, while the REP Stop termination has low priority.

The Mispredicted Branch Direction termination is special in that it does not have a specific fixed priority relative to all AP terminations. Instead, the effective branch direction (based on the predicted direction and the correctness of the prediction), in combination with AP's termination, determines the action initiated by DEC's Backend.

AP Termination Bus

Table 6 shows the format of AP termination bus 60. The bus uses the standard CMOS-style time-multiplexed I/O and signals normal terminations and a variety of abnormal terminations of p-ops.

Due to the timing of DEC's, decode and p-op assembly pipeline, if an AP termination code is sent time-multiplexed one phase earlier ($\phi 2$-$\phi 1$) then it is possible for DEC to respond immediately with an abort cycle followed by the correct next p-op (from the next macro-instruction or from the appropriate exception processing or other p-op sequence). The encoding of the termination code is such that for the important cases DEC is able to provide ideal response time, either issuing another p-op or aborting and issuing a correct next p-op. For the other exception cases there will be an effective extra cycle in the response time; specifically there will be one cycle before an abort cycle occurs, followed by the correct next p-op the next cycle.

This extra cycle in handling most abnormal terminations is split between DEC's Backend figuring out what's happening and what to do, and DEC's Decoder being jammed and vectored, and starting decode for the correct next p-op. For the quick terminations the Backend has a limited handling situation. Aiding this quick handling is the fact that the Backend can anticipate the p-op tag which the next termination is associated with, because the AP always terminates p-ops in order.

Quick terminations are provided for these situations: normal termination of a p-op; control bit update (from AP to DEC), optionally also indicating mispredicted address and/or D-bit. For a normal termination the Backend, with; the p-op tag and information about the type of p-op in hand, principally need to reflect this termination in hold condition signals to the Decoder and to the branch control logic. For a control bit update without mispredicted address and/or D-bit, the termination bus transfer provides updated values for the control bits in question, after which the Decoder can be allowed to continue decoding the macro-instruction strum. If mispredicted address and/or D-bit is also indicated, the timing of this termination effectively becomes like all the other non-quick terminations.

As mentioned above, AP must terminate p-ops in order (with respect to their order of issue by DEC). This is independent of the order in which AP processes p-ops, though for other reasons there are constraints on the order in which AP may process p-ops. In all cases a p-op may be terminated any time after it is fully completed. Additionally though, and somewhat similar to the situation for IEU, there are two cases as to the earliest time when p-ops may be terminated. In case no. 1, for p-ops not requiring a DXBus transfer after execution, the p-op may be terminated once the correct termination is known. In case; no. 2, for p-op's which do require such a transfer, the p-op may be terminated once it is known that the transfer is definitely about to occur. In other words, for case no. 1, a p-op can be terminated just after all system memory references and necessary checks (relating to abnormal terminations) have been completed. For case no. 2, a p-op can be terminated once AP knows that it won DXBus or PAdrBus arbitration for the transfer and that the transfer will definitely occur. This includes the case of a PAdrBus memory address reference transfer being aborted due to a TLB miss; the termination cannot occur before knowing whether the transfer will actually complete. Any additional restrictions/requirements by DEC, specific to certain terminations, are described below.

Note that AP can terminate p-ops which have been processed except for receiving a general-purpose register update from IEU, NP, or memory, before the update is received. The update essentially requires no further processing and simply needs to be stored into the appropriate register and register interlock control updated to reflect this. AP is guaranteed to receive these updates by the time that the associated p-op is fully terminated, and thus before it is retired. AP of course must still appropriately keep track of expected register updates with respect to aborts occurring.

After AP signals an abnormal termination in response to a detected abnormality while processing a p-op, it appropriately finishes processing of that p-op. Depending on the termination, AP may then suspend processing of further p-op's. This behavior occurs after abnormal terminations for which DEC's response is to initiate exception processing. In all other cases AP will continue processing.

After suspending processing AP will save and/or freeze any necessary internal state and wait for an eventual response to the abnormal termination. This response may never occur and more generally AP must coordinate with all responses which initiate exception processing.

AP Terminations

The following describes the terminations set out in Table 6. Note that, for all the abnormal terminations indicating exceptions on p-ops, bits <3 . . . 0> of the Termination Id directly corresponds to the interrupt number of the exception for which processing should be initiated. The two exceptions to this are the alternative Debug and General Protection fault codes (i.e., 1111 010X) used for special cases. The Shutdown abnormal termination (code=1111 1001) is also special in that exception processing will not occur; instead DEC will shutdown.

No Termination must be signaled whenever there is not a real termination to signal. The termination bus is valid every clock cycle and must always indicate something. Normal Termination is signaled when no abnormalities are realized during the processing of a p-op.

Control Bit Update is used in conjunction with all DECquiesce p-ops. These are p-ops which directly or indirectly affect the state of the IF, D, and/or B bits (found in EFlags and various segment descriptors). When AP has determined the new value(s) of the bit(s) affected, this termination is used to send the updated values to DEC.

Note that this is not a true termination, and in particular does not terminate the p-op causing the control bit change(s). The usual p-op termination is still required, and must occur after the control bit update. (The control bit update must follow the termination of the preceding p-op as well.) Also note that DEC will continue p-op issue once the Control Bit Update termination is received, independent of termination of the p-op whenever afterwards. The general idea is that as soon as AP knows the new values of the affected control bits, during the processing of the p-op, AP will send the update to DEC and continue with processing of the p-op.

Since the above control bits represent programmer-visible bits, AP and DEC must potentially be able to back out of modifications to these bits. To avoid this (with no significant performance impact), AP modifies its master copy of these bits when it signals a Control Bit Update (as opposed to sometime afterwards), and delays both these actions until the associated p-op is the oldest outstanding p-op. In essence, the need to signal a Control Bit Update implies an AP quiesce before signaling tile update.

A second form of Control Bit Update is similar to the first form but also indicates Mispredicted Address and/or D-bit on the bus transfer of the update. This is used on transfer control p-ops for which DEC has predicted the target address (and assumed the D-bit isn't changing). If the (physical) target address predicted by DEC for a transfer control p-op is incorrect (i.e., different from the (physical) address generated by AP), then AP must signal this as well as send an updated value for the D-bit. AP, of course, must also send out an address update (namely the correct target address) to the instruction cache tags.

AP does all this by sending out the correct target address over the PAdrBus and concurrently signaling Control Bit Update Termination with Mispredicted address and/or D-bit. (The concurrency is required.) The update is similar to the first form above with respect to sending updated control bit values. In addition, DEC will modify certain internal state appropriately to reflect the misprediction, and will restart instruction fetching and decoding with the correct address and D-bit. As above, it is inherently guaranteed that the Decoder will receive updated control bits before it is able to do the next valid macro-instruction decode.

Unlike the first Control Bit Update, this is a true termination, and in particular terminates the associated transfer control p-op. Given the timing of when AP sends out the correct target address and signals the update, AP is able to avoid signaling Control Bit Update Termination if another abnormality was detected (i.e., an exception). Thus, AP will either send out the address and signal the update termination, or will signal an abnormal termination (along with an invalidated address).

For a page cross which results in an abnormality, a PAdrBus transfer does not occur. This can be either because of a segment overrun (which should result in a General Protection fault), a page fault, or both. AP signals an abnormal termination to indicate that a fault occurred. Exception processing will be initiated later if instruction execution truly needs to cross the page boundary. From AP's viewpoint the processing and termination of a page cross request is independent of surrounding p-ops; DEC takes care of appropriately prioritizing an exception on a page cross with respect to the p-op stream and p-op exceptions.

Each of the abnormal terminations for exception is used to signal the corresponding architecturally defined exception. In two cases (e.g., General Protection fault) there is a pair of Termination Id's for signaling the exception. One is to be used generally while the other of the pair is used in certain exception circumstances which need to be distinguished insofar as having different priority relative to abnormal terminations by other functional units (i.e., IEU and NP).

It should be noted that some of these abnormal terminations relate to specific macro-instructions. In particular the 387 Not Available, Invalid Opcode, and General Protection (code=1111 0100 terminations are signaled on the 1st p-ops of relevant p-op sequences. Further, some of these abnormal terminations, while not relating to specific macro-instructions, do relate to macro-instruction boundaries. The General Protection termination (code =1111 0100 and the Debug termination (code=1111 0101, for debug faults) are signaled on the 1st p-ops of macro-instruction p-op sequences. The Debug termination (code=1111 0001, for debug traps) is signaled on the last p-op of macro-instruction and task switch p-op sequences.

MCC Termination Bus

MCC 25 termination bus 65 is a 1-bit bus that uses the standard CMOS-style time-multiplexed I/O. The actual signal transfer occurs on the $\phi1$-$\phi2$ boundary (i.e., MCC Term is a $\phi2$ transfer); the transfer on the other phase boundary is undefined. This bus is used to signal termination of normal memory writes directly resulting from p-ops. No termination is generated for memory reads, system memory references, and other references (such as I/O).

MCC receives memory reference addresses from AP in order (relative to the issue order of p-ops which result in the memory references). MCC must also terminate memory write references in this order. Because of this, no explicit transfer of a p-op tag is necessary for termination signaling. Based on the in order termination of writes, the Backend of DEC, which is monitoring the termination buses, will anticipate which p-op tag the next termination from MCC is associated with.

The termination of a memory write is signaled when the address is received from AP and is put into the appropriate write reservation queue. This is independent of when the associated dam is received by MCC and when the write exits the queue. Writes of read-modify-write operations by a p-op are also terminated. For p-ops which result in a misaligned or greater than four byte memory write, it is necessary for AP to generate more than one word-aligned address. The termination of the write for such a p-op is signaled once the last address is put into a reservation queue.

Regardless of MCC terminating p-ops which result in a memory write, AP generates its own termination of such p-ops. This occurs when it transfers the last of one or more word-aligned addresses over the PAdrBus to MCC. Since MCC is usually able to put the address(es) into a queue immediately, it would not normally be necessary for MCC to indicate the reception of memory write addresses. For cases, though, in which a MCC is not immediately able to put an address into the appropriate write reservation queue (due to the queue being full or an overlap with a previous (older) write in one of the queues), a termination by MCC is necessary. In these latter cases the termination would be delayed to thus prevent DEC from advancing p-op issue.

If MCC did not have a termination of its own which it could delay, then the following could occur. Once AP terminates the; p-op, DEC would believe that the p-op generating the write is completed and safely in a write reservation queue. It would proceed to issue seven or more p-op tags past the tag associated with this write address. MCC would then have problems handling aborts, matching data with addresses, handling overlapping memory reads, and eventually performing writes to the cache.

Consequently, MCC will have the ability to delay putting addresses with overlap problems into a queue (and of course also the ability to hold up AP from sending any more addresses). While MCC delays an address (and assuming this is the last address for one p-ops write), the termination of the write by MCC will be similarly deferred. Concurrent with the address finally being put into the appropriate queue, MCC will then signal termination.

While a p-op, for which a termination from MCC is expected, is fully terminated by all expected functional units except MCC, DEC will continue to consider the p-op outstanding. Essentially, DEC treats MCC's termination of a p-op on equal terms with other functional units' terminations insofar as when a p-op may be retired.

Insofar as MCC only signals normal terminations, there is no direct interaction with abnormal terminations by other functional units (AP,IEU,NP). Indirectly, though, it will not always be possible for MCC to terminate a p-op for which an MCC termination is expected. For cases in which AP abnormally terminates a p-op and does not generate all the addresses for an associated memory write (and may not be able to), DEC will behave accordingly. Specifically, DEC will recognize these case,s, not delay processing of the abnormal termination for MCC's term/nation, and maintain proper tracking of the p-op lags of outstanding memory writes.

There are also special situations where AP will normally terminate a p-op but will not generate an associated memory write. In these cases AP will signal Normal Termination, But No Write to indicate to DEC that the write was not issued and consequently not to expect a termination from MCC.

NP Termination Bus

The NP termination bus, roughly speaking, is a 2-bit bus (presuming in-order p-op termination) and just signals floating point math exceptions. Provision is made in the CPU logic for including the optional NP, but it will not be detailed here.

Register Reassignment

As noted above, one of the mechanism that is used for backing up the state of the CPU in the event that it is necessary to flush instructions is register reassignment. This technique entails mapping a set of programmer visible (i.e., virtual) registers into a larger set of physical registers. The number of physical registers exceeds the number of virtual registers by at least the maximum number of p-ops that are allowed to be outstanding and that can modify a register. The technique is applied to both the general register file and the segment register file.

The particular macro-instruction architecture (80386) provides eight virtual general registers, designated VR0–VR7, and six virtual segment registers. As noted above, at most seven p-ops total and at most two p-ops that change a segment register are allowed to be outstanding. In line with this, AP 15 includes a set of fifteen physical general registers, designated PR1–PR15, and eight physical segment registers, while IEU 17 includes fifteen physical general registers. Although a physical register PR0 exists in the IEU, it is used for other purposes.

FIG. 5 is a schematic illustrating the mapping of virtual registers VR0–VR7 to physical registers PR1–PR15. Each of the physical registers has an associated valid bit, indicated schematically as "V." The valid bits are used by the functional unit as described below. In order to support the general register reassignment, Backend register reassignment logic 175 maintains pointer set array 177 and free list array 178. The pointer set array and the free list any each provides storage for eight lists, each list having a 3-bit index corresponding to the 3 least significant bits of the tags of outstanding p-ops. Each pointer set and each free list is represented by a column in the figure.

The pointer set and free list for a given index maintain the state immediately prior to the issuance of a p-op whose tag corresponds to the index. The pointer set contains eight entries, corresponding to virtual registers VR0–VR7, each entry containing a pointer to one of the physical registers. The free list contains seven entries, containing pointers to the physical registers that are not pointed to by members of the pointer set.

Assume an initial state before the issuance of a p-op with tag=0. In this initial state, VR0 maps to PR8, VR1 to PR7, VR2 to PR6, ..., and VR7 to PR1; and the free list includes pointers to PR9 through PR15, with PR9 at the head and PR15 at the tail of the list. This state is stored in the column of entries headed by tag=0.

Consider now, the following representative series of three p-ops with tags 0, 1, and 2:

| | |
|---|---|
| $VR0 = VR0 + VR3$ | tag=0: |
| $VR3 = VR3 + VR5$ | tag=1: |
| $VP4 = VR0 + VR3$ | tag=2: |

Since VR0 was previously mapped onto PR8, p-op(0) cannot be allowed to modify PR8 until it is established that p-op(0) will be allowed to complete. Accordingly, the mapping that existed before the start of p-op(0) must be modified so that VR0 maps onto a physical register in the free list. PR9 is at the head of the free list and so VR0 is mapped onto PR9. PR8 is put at the tail of the free list since it will not come to the head until eight p-ops have been issued, whereupon p-op(0) is guaranteed to have been retired. Each other item in the free list advances toward the head. Thus, the actual p-op that is issued with tag=0 will be PR9=PR8+PR5.

The next p-op, namely p-op(1), seeks to modify VR3. In order to allow backing out of this p-op, VR3 is mapped onto the physical register that is at the head of the free list, namely PR10. PR5 is put at the tail of the free list and PR11 advances to the head of the free list. The actual p-op that is issued with tag=1 is PR10=PR5+PR3.

P-op(2) seeks to modify VR4. Accordingly, VR4 is mapped to physical register PR11, and PR(4) is put at the tail of the free list. The actual p-op that is issued with tag=2 is PR11=PR9+PR10.

When a p-op that modifies a physical register arrives at the functional unit, the physical register's valid bit is cleared (signifying invalid), and is only set (signifying valid) when that p-op terminates. This is necessary to ensure that the correct data is present for a later p-op that seeks to read the physical register. In the specific example, p-op(0) modifies PR9 and P-op(1) modifies PR10. Since p-op(2) requires the contents of PR9 and PR10, it must have valid source registers (PR9 and PR10) before it can execute. This will occur only when p-op(0) and p-op(1) have terminated. Note that p-op(0) and p-op(1) don't have to retire, since if either is flushed, p-op(2) will also be flushed.

Write Queues in the Data Cache Subsystem

FIG. 6 is a block diagram of MCC 25, which provides control for the data cache subsystem. Its job includes: mating write addresses produced by AP 15 and delivered via PAdrBus 55 with corresponding data produced by any of several chips and delivered via DXBus 58; byte-alignment of write data (which is produced right-justified in 32-bit DWords) with the byte addresses specified by the AP; checking for memory data dependencies between writes and subsequent reads to the same addresses and short-circuiting data as soon as they are available; and maintaining coherence of execution by aging write operations until it is assured that the p-ops that produced them have been successfully terminated, allowing write operations to be aborted when necessary without modifying main memory or cache, per se.

The data cache subsystem deals with three categories of data operations. Normal data accesses are the programmer-specified data accesses, exclusive of those performed by NP 20, if any. The other two categories are system accesses and NP accesses. Data read from memory in each category must reflect writes made by earlier p-ops of any category, but different categories of writes can be processed asynchronously, that this, it is assumed that nearby writes (in respect to order of execution) of different categories will not modify the same addresses or that if they do the effect of asynchrony of writes between categories will be benign.

MCC 25 includes a number of queue structures, including a write reservation queue (WRESQ) 300 with associated write buffer 302 and multiplexer 303, a system write queue (SYSWQ) 305 with associated system buffer 307, and an NP write queue (NPWQ) 310 with associated NP buffer 312 and multiplexer 313.

WRESQ 300 serves only normal data accesses. It performs all of the functions listed above, including alignment of each write datum, which may be a single byte, a 16-bit Word, or a 32-bit DWord but which always arrives from the execution unit right-justified in a single 32-bit DWord, as directed by the corresponding address(es) which may specify alignment in memory on arbitrary byte boundaries and checking for memory data dependencies between writes and subsequent reads of any category to the same addresses.

SYSWQ 305 buffers up system writes until the p-ops that produced them have been successfully terminated and they have been written to memory. It provides for at most four outstanding system writes. System accesses are accesses performed by the AP to access the hidden system structures: page directory entries, page table entries, segment descriptors, and task state segment data. All system writes occur as single-DWord read-modify-write operations that set Accessed or Busy bits. It is guaranteed that all system accesses will occur in order, since the AP does not perform out-of-order execution. Furthermore, since system writes result from read-modify-write operations, the address must arrive at MCC before the write data.

NPWQ 310 buffers up to eight NP write address (sufficient to hold the results of at least two NP p-ops. NP data accesses, those directed to, and from the NP, differ from normal data accesses in three principal ways: single NP p-op can read and/or write up to ten bytes of data, whereas a normal p-op can access at most four bytes of data; hence the NP may perform multiple DWord transfers to perform a write operation specified by a single p-op. Data for NP p-ops always arrives at the MCC in sequence, i.e., it arrives in the same sequence as the address arrive.

Since WRESQ 300 is the most complicated write queue and illustrates the handling of p-op terminations and aborts, it will be described in detail. WRESQ consists of a complex data and instruction buffer accommodating eight entries. Each entry includes a 30-bit wide content-addressable memory (CAM) register for DWord addresses (where a DWord is 32 bits of data), a special-purpose four-bit Tag CAM which includes numeric comparison logic and a Last bit and a Released bit, and a four byte-wide data register with associated control logic including Valid bits for each data byte and a Present bit for the entire data register.

The WRESQ receives memory addresses for data accesses from a FIFO buffer called the Physical Address Bus Queue (PAdrQ) 320, where they are buffered as they arrive from the AP. Each such address is accompanied by the type of access to be performed (read, write, or read-modify-write), the tag of the p-op that produced it, a four-bit byte-enable mask indicating the bytes of the DWord to be transferred to and/or from the addressed DWord, and a Last bit that indicates whether the address is the last to be produced by its p-op.

Each address received from the PAdrQ for a write or read-modify-write access is associatively compared to all addresses previously entered into the WRESQ that have Valid bits set in any of the byte positions indicated by the byte-enable bits accompanying the address. If any is found, indicating that an overlapping write is already present in the WRESQ, the processing of new addresses into WRESQ must be suspended until the overlapping write has been written to memory and removed from WRESQ.

In this case, the MCC must suspend accepting more addresses for any write queue until the location has been written to memory. This is referred to as a pipeline stall, in which case the MCC allows addresses to back up in the PAdrQ and if this structure threatens to overflow the MCC locks the PAdrBus, preventing the AP from issuing more addresses. Otherwise, if no pipeline stall is required or after any such stall has been resolved by removing the overlapping entry, the new address is assigned a location in the WRESQ.

Locations in WRESQ 310 are selected for assignment by an assignment counter in round-robin fashion. If the selected location is free the address is copied into the Address CAM, the tag and the Last bit are copied into the Tag CAM, the four Present bits and the Released bit are set to zero, and the four Valid bits are set correspondingly to the byte-enable bits specifying the bytes of the DWord that are to be written. If, on the other hand, the WRESQ location is still in use when it comes up for re-assignment, as is indicated by one or more Valid bits being set in the location, the MCC must suspend accepting more addresses (stall the pipeline) until the location has been written to memory.

At or after the clock period in which a new entry is written into the WRESQ, data is written into the data bytes for which Valid bits are set. There is no guarantee that the AP will transmit the address before the executing unit provides the data to be written, nor is there any guarantee that MCC itself can process addresses as fast as they arrive. Therefore, the data may already have been sent to MCC before the WRESQ entry for it has been established. Eight-entry WBuf 302 accommodates this. The WBuf is located between the DXBus (the bus on which write data is delivered to MCC) and the input to WRESQ itself. Dam arriving on DXBus is identified by the type of operation it represents (normal memory write if destined to the WRESQ) and the tag of the p-op that produced it.

As normal memory write data arrives on DXBus it is stored in the 32-bit WBuf entry addressed by the least-significant three bits of its 4-bit p-op Tag, the most-significant bit of the p-op Tag is stored with the entry, and (unless a Tag CAM hit occurs as described below) a Present bit is set for the entry. Simultaneously, its tag is also looked up in the Tag CAM of WRESQ. If a location (or two adjacent locations) for the data is found in WRESQ, including one location having its Last bit set, the data is immediately written into that location (or locations) and in this case the WBuf entry's Present bit is not set. Similarly, as an address having its Last bit set is entered into WRESQ, the WBuf entry corresponding to the tag of the p-op that produced the address is interrogated and if its Present bit is set the data is copied out of the WBuf entry, the WRESQ Present bit is set, and the WBuf Present bit is cleared.

By the above two mechanisms, regardless of whether the data or address arrives first or they arrive simultaneously, when both the data and address are present the address and data are both entered into the WRESQ, the Present bit of the WBuf entry for the p-op is cleared, and the Present bit(s) of the WRESQ entry(ies) are set. At this time, the WBuf location is free for re-use. Since the data may arrive out-of-order with respect to addresses, in order to allow processing to occur as fast as possible two independent paths into data registers and Present bits of WRESQ are provided. One, sourced from the WBuf, can write into the location to which the associated address is simultaneously being written (as selected by the round-robin counter). The other, directly from the DXBus interface can write into the location(s) identified by the Tag CAM. This allows a newly arrived address to be paired up with data from WBuf and written into a new entry in the same clock cycle that a newly arrived datum from the DXBus is written into a previously established WRESQ entry.

Data that is entered into WRESQ passes through a rotator which byte-aligns it into the same byte positions it will occupy in memory. A separate rotator is provided for each of the two data paths into WRESQ. The number of contiguous Valid bits having a value of zero, counting from the least-significant byte position of the (first) WRESQ entry (of, possibly, two adjacent entries), indicates the number of byte positions to the left that the data must be rotated for alignment before the data write occurs into WRESQ. Logic associated with the Valid bits provides this data to barrel-shifting logic by gating out the Valid bits of a location if and only if the preceding WRESQ location does not also contain an address for the same p-op tag.

Whenever data is written into a location in the WRESQ it is also written into any adjacent location having the same tag value (if addressed by the Tag CAM) or adjacent in the direction of earlier entry assignment and having its Last bit negated (if addressed by the new entry assignment counter). Thus, since the data being written is at most four bytes wide, byte-wise rotating the data to match the byte positions for one DWord and then writing both DWords writes all four bytes into the appropriate positions in both DWords simultaneously for a non-aligned write operation that straddles a DWord boundary in memory.

Whenever a normal-category address that has its Last bit asserted is extracted from the PArdQ the MCC asserts an MCC Termination signal to the DEC. Since addresses are processed in-order (i.e., in the same order as the p-ops that generated them issued from DEC) and DEC is aware of which p-ops will generate a normal memory access. DEC can unambiguously associate an MCC termination with a given p-op even though the termination does not explicitly contain the tag of the p-op for which the address(es) has been processed. The termination from MCC allows DEC to insure that no more than eight WBuf locations are needed in the worst case to accommodate the data from all p-ops for which WRESQ entries have not yet been established, and that irrelevant data and addresses can be properly flushed from queues in case of an abort. DEC insures this because it does not issue more than seven p-ops beyond the oldest that produces a normal access and has not yet been terminated by MCC.

As addresses are extracted from the PAdrQ, each is associatively compared to all addresses previously entered into WRESQ (and also the other two write queues), in the manner described above for write addresses. As previously described, any overlap of an incoming write address with an existing WRESQ entry results in a pipeline stab until the earlier entry has been written to memory and removed from the write queue. However, non-overlapping writes, even if modifying (different pans of) the same DWord, may be entered into the queues. Addresses for read- and read-modify-write operations (read addresses) are also associatively compared to write queue entries. As with writes, this comparison is performed on a byte-by-byte basis, as determined by the conjunction of the read address' byte-enable bits and the; corresponding Valid bits of the queue entries.

If no WRESQ entry addresses a byte specified by the read address, or if each entry that addresses a byte specified by the read address (a write-queue hit) has its Present bit asserted, then the MCC signals DCI 37 to perform a normal cache look-up for the address. (Any cache access may result in a delay in case of a cache miss, necessitating a main memory operation to retrieve the requested data.)

If, on the other hand, the read address hits in one or more write-queue entries that do not have their Present bits asserted, then processing of addresses from PAdrQ must be suspended (the pipeline stalled) until data has been received for all such entries. Once any such stall has been resolved and cache data is available, the MCC directs the DCI to gate out onto DIOBus 57 only those bytes for which no write queue hit has its Valid bit asserted. The other bytes, selected by the Valid bits of all write-queue entries that hit the address, are driven out of the write queue and onto the DIOBus by the MCC. Thus, write data that has not yet been posted to memory can be "short-circuited" to later reads. Since the pipeline is stalled whenever a second write is received for a byte for which a write already is pending in a write queue, there can be no more than one entry that addresses a given byte of data; however, there may be several entries that supply different bytes of the same DWord read. The write queues merge the Valid bytes from all such entries to select data to drive out onto the DIOBus.

Like other units of the CPU, the MCC must track the tag status provided to it by DEC via the tag status bus. Each clock cycle, DEC transmits one of two message types on the tag status bus, either an advisory of the oldest outstanding p-op tag (OOTag) or an abort tag (ATag). The WRESQ maintains a pointer to its oldest entry called the Oldest Entry Pointer (OEP). An entry remains ineligible to be written to memory until it is becomes older than the OOTag. Each cycle in which an OOTag is received, the OOTag is compared to the tag CAM contents of each write queue entry having one or more Valid bits set that does not already have its Released bit set. Tag comparison is performed by subtracting the four-bit OOTag from the entry's four-bit Tag using four-bit two's-complement arithmetic. Tags are issued in binary counting sequence (0000, 0001, 0010, ... . 1110, 1111, 0000 . . . ) and no more than seven tags are outstanding at any time, so that the value of OOTag can jump by at most eight from one cycle to the next (if all seven outstanding p-ops are retired and a new p-op is issued in the same cycle). Therefore, if the value of the most significant bit of the difference formed by subtracting OOTag from art entry's tag is "1" it indicates that the entry's tag is between one and eight p-ops older than the OOTag, since it cannot be eight or more younger than the OOTag. For each entry that is thus found to be younger than the OOTag, the entry's Released bit is set. The entry can be written to cache and/or main memory when and only when the entry pointed to by the OEP has its Released bit set, its Present bit set, and one or more Valid bits set. When the write occurs, the entry's Valid bits are cleared and the OEP is advanced to the next sequential entry that has one or more Valid bits set, if any exist.

When the DEC signals an abort, the ATag is checked against the p-op tag fields in all queues, including the PAdrQ, the WRESQ, and the other two write queues. The check is performed in the same manner as the check to determine when an entry can be released, i.e. by subtracting the provided ATag from the tag field specified in the queue. If the tag field of the queue entry is strictly greater than (older than) the ATag, the entry remains in the queue, and otherwise its Valid bit(s) are cleared. Depending on the control logic implementation of the queue, pointers may also have to be adjusted. For the WRESQ, if entries are deleted the assignment pointer is moved back to the earliest deleted entry and, if this would move it past the OEP, the OEP is moved to the entry preceding the assignment pointer.

A similar check is made for the entries of the WBuf associated with the WRESQ and similar structures elsewhere that are addressed by tag value, but since the address of the entry in WBuf is simply the lower three bits of its tag, only the most significant bit (MSB) of the entry's tag is stored in the entry itself; it suffices to reset the Valid bits of all entries that have 3-bit addresses equal to or greater than the lower three bits of ATag and which have a stored MSB equal to that of the ATag, or which have addresses less than the three least significant bits of ATag and have MSBs opposite to that of the ATag.

As for all functional units of the CPU, the MCC disregards data present on internal busses during an abort cycle and re-transmits any data it was sending that is still appropriate after the abort. Thus, in a single cycle, the MCC (and the rest of the CPU) resets itself to the state it would have been in had the p-ops bearing tags greater than or equal to the ATag never been issued.

Pseudo-Op Handling In the IEU

FIG. 7 is a block diagram of IEU 17. The IEU implements two data paths, a single-cycle data path 400 and a multi-cycle data path 405. The single-cycle data path executes all integer instructions that can be completed in one cycle, such as addition, subtraction, and shift. The multi-cycle data path executes all integer p-ops that require multiple cycles, such as multiplication, division, and ASCII and decimal arithmetic. The two data paths utilize a common register file 410, which contains the physical registers into which the virtual registers are mapped, as discussed above in connection with register reassignment.

Each of the data paths includes elements coupled to a common set of buses 412, with a bus coupler 415 providing isolation between the two data paths. The single-cycle data path includes a general purpose ALU 420, a barrel shifter 422, and special logic 425 for sign propagation, leading zero and one detection, and the like. The multi-cycle data path includes multiply/divide circuitry 430 (8×32 multiplier array) and circuitry 435 for ASCII and decimal adjust.

Input p-ops are received from p-op bus 52, and directed to a p-op queue 450. A multiplexer 452 selects which p-op in the queue to execute, and the p-op to be executed is communicated to single-cycle control logic 455 (implemented as PLA's). For a single-cycle p-op, control logic 455 controls the single-cycle data path elements. For a multi-cycle p-op, it controls the multi-cycle elements for the first cycle of the p-op and provides an address to a microcode ROM 460, which along with multi-cycle control logic 462 (PLA's) provides control for subsequent cycles of the p-op.

In the case of ALU p-ops, where the result is stored in a register, a termination is immediately entered into a termination queue 470 whose contents are put out on the IEU termination bus. With respect to a memory write, the result either goes directly to the DXBus, in which case a termination is entered into the termination queue, or the output is placed in a DXBus output queue 475 for subsequent output. Once the bus is available, the termination is entered into the termination queue.

P-op queue 450 is eight (8) deep. The p-op queue has multiple read ports and a single write port. Queue control logic 480 controls the queue to function normally like a FIFO (first in first out) but it also supports out of order reads. The queue control logic also indicates if the queue has entries or doesn't have an entry. The queue control logic also identifies the position of the p-op in the queue.

If the p-op queue receives a p-op when the queue is empty, then the p-op is immediately decoded and appropriate control signals are generated. During the instance when the decoding of the p-op is in progress, ready to execute checks are made. The checks involve data operands and flag operand dependency and some special execution criteria, such as in-order execution and functional unit serialization. If the p-op fails the ready to execute checks then some or all the control signals are disabled. If the p-op is not executed then the p-op is placed in the queue.

If there are entries in the queue then the queue functions like a FIFO. The p-op at the head of the queue and the next younger p-op in the queue are read. Ready-to-execute logic 482 checks for both the p-ops are made. The ready-to-execute check for the p-op at the head of the queue includes data operand dependencies. If the head of the queue passes the ready to execute checks then the p-op is decoded and executed. If the p-op cannot be executed then it is re-issued for checks in the next cycle of operation.

The ready-to-execute logic checks for the next younger p-op in the queue includes data operands and flag dependencies, interlock with respect to the p-op at the head of the queue, and whether the p-op is subject to a special execution criterion (such as in-order execution). For example, it checks that the valid bit is set in any source registers required by the p-op. If the p-op at the head of the queue fails to execute then the next younger p-op in the queue will be decoded and executed if it passes through all the ready to execute checks. If both the head of the queue and the next younger p-op in the queue can be successfully executed then the head of the queue is executed.

Multiple read pointers and a write pointer are kept to track the queue operation. If the next younger p-op is executed then the corresponding read pointer is updated to point to the next entry in the queue. If the p-op at the head of the queue is executed then the first read pointer gets the value of second read pointer and second read pointer is updated to point to the next entry in the queue. The write pointer is used for pointing to the first empty location in the queue. During an abort cycle all the pointers are compared with the abort tag and set to appropriate values based on the result.

Queue control logic 480 has a status bit for each entry in the queue. The status bit is set to "valid" while loading a new p-op in the queue. After the p-op is successfully executed the status bit is set to "invalid". If the entries in the p-op queue are to be flushed during abort cycles then the appropriate status bits are set to "invalid". The p-op identified for execution is decoded. If the identified p-op for execution is a single-cycle p-op then the control signals for single-cycle data path 400 (register file, ALU, barrel shifter, and special logic) will be generated by control logic 455. The single-cycle p-op is executed in a single clock cycle. Multi-cycle data path 405 doesn't perform any function during this time.

If the p-op identified for execution is a multi-cycle p-op then the first state control signals are generated by the single-cycle control logic. The single-cycle control logic also activates microcode ROM 460. The control signals for the remaining states are generated from the microcode ROM and multi-cycle control logic 462. Multi-cycle data path 405 performs the operation during this time. The multi-cycle operation will use only register file 410 from the single cycle data path.

It is possible to perform concurrent (parallel) execution of p-ops. If the identified p-op for execution is a multi-cycle p-op then possible performance advantage is gained by executing the subsequent single cycle p-op from the queue. It is then possible to execute single cycle p-ops using the single-cycle data path and multi-cycle p-ops using the multi-cycle data path. The multi-cycle control unit controls the concurrent execution of p-ops. The single cycle p-op will not be executed if there is data or status flag dependency with respect to multi-cycle p-op. The single cycle p-op will also not be executed during the time there is a resource conflict between a multi-cycle p-op and the single-cycle p-op (during writes to register files and status flag updates).

The multi-cycle control logic has a state machine which will identify the state of operation. The integer execution unit can be in one of four states: single-cycle, multi-cycle, concurrent, or idle.

The buses between the single-, and multi-cycle data paths are disconnected by bus coupler 415 during the concurrent operation. The buses are normally connected during the multi-cycle operation to allow data transfer front the register file and/or to use the result from an p-op for the next p-op.

After the p-op is executed the result is stored into the register file or memory write operand queue (DXBus output queue 475). The flags are updated whereupon the p-op is terminated.

If a p-op is identified to be executable then it is presented to the single-cycle and/or multi-cycle control logic If the functional unit is found to be busy then the p-op is not executed. This is signaled back to the p-op queue control and ready to execute logic Appropriate adjustments to the multiple read pointers is made.

The p-op queue, queue control logic, and ready to-execute logic will normally try to keep issuing p-ops based on resolving data operand interlocks and special execution criteria. The control logic of the various functional units within the IEU (ALU, barrel shifter, special logic, multiply/divide circuitry) will resolve the hardware resource conflict and either perform a single-cycle, multi-cycle, or concurrent operation. If the issued p-op cannot be executed due to resource conflict signalled by a signal called QNEXT then it is requested to be re-issued by the p-op queue control logic. The flags are tracked using a flag stack 485.

Conclusion

While the above is a complete description of the preferred embodiment of the invention, various modifications, alternatives, and equivalents may be used. For example, while the embodiment described above is implemented with a separate chip for each functional unit, the basic architecture with its distributed pipeline control would be equally effective and advantageous in a single-chip embodiment. Similarly, while the specific embodiment executes a particular instruction set, other embodiments could be designed to execute other instruction sets.

Additionally, while a particular mechanism for communicating tags to the functional units (tag status bus with OOTag or ATag using encoded tags) is described, there are other possibilities. One possibility, in a system where at most n p-ops can be outstanding at a given time, is to represent a tag as a single set bit in an N-bit vector where N is equal to or greater than n. Such Tags are issued sequentially such that the collection of outstanding p-ops is represented by a contiguous (in a cyclical sense) group of set bits in an N-bit vector. This vector is communicated to the functional units to signify status, while a similar type of vector is communicated to signal aborts.

Therefore, the above description and illustrations should not be taken as limiting the scope of the invention which is defined by the appended claims.

APPENDICES

Five appendices on a single microfiche are filed herewith and ate part of this application. In some instances the appendices describe earlier embodiments, and as such differ from the body of the specification and Tables. In such a case, the body of the specification and the Tables take precedence.

Appendix 1 is a specification of the p-op bus;
Appendix 2 is a specification of the PAdrBus;
Appendix 3 is a specification of the DIOBus;
Appendix 4 is a specification of the DXBus; and
Appendix 5 describes the IEU flag stack.

TABLE 1

| Pseudo-Op Bus Format | |
|---|---|
| Bit(s) | Field |
| On first $\phi 1$ | |
| <51...48> | SegReg |
| <47...45> | |
| <44...41> | SrcAReg |
| <40...37> | IndexReg |
| <36...33> | EASpec |
| <32> | ASize |
| <31> | TwoCyc |
| <30...29> | MemRef |
| <28...25> | SrcBReg |
| <24...21> | DestReg |
| <20> | RegStore |
| <19...17> | OperSize |
| <16...14> | OperSpec |
| <13...4> | Opcode |
| <3...0> | PopTag |
| On second $\phi 1$ | |
| <47...14> | (undefined) |
| <13...4> | Opcode |
| <3...0> | (undefined) |
| On first $\phi 2$ | |
| <51...48> | DestSegReg |
| <47> | LastPop |
| <46> | (reserved) |
| <45> | Lock |
| <44...40> | Statmod |
| <39...32> | Imm8 |
| <31...16> | ImmDispHi |
| <15...0> | ImmDispLo |
| On second $\phi 2$ | |
| <47...32> | (undefined) |
| <31...16> | ImmHi |
| <15...0> | ImmLo |

TABLE 2

| Physical Address Bus Format | |
|---|---|
| Bit(s) | Field |
| On first $\phi 1$ | |
| <25> | DTAGReq |
| <24> | ITAGReq |
| <25> | DecReq |
| <22> | MCCHLd |
| <21> | ARReq |
| On second $\phi 1$ | |
| <20> | Lok |
| <19> | Trm |
| <18...4> | Physical Address <16...2> |
| <3...0> | Byte Select |
| On first $\phi 2$ | |
| <25...23> | Stream |
| <22...20> | Operation |
| (3...0> | InstrNum (=P-op Tag except for Stream 0) |
| On second $\phi 2$ | |
| <19> | Val |
| <18...4> | Physical Address <31...17> |

TABLE 3

| DIOBus Format | | | |
|---|---|---|---|
| On $\phi 1$ | | On $\phi 2$ | |
| Bit(s) | Field | Bit(s) | Field |
| DIOCtl | | | |
| <4> | Last Operand | <4> | RdData Valid |
| <3...0> | Frame | <3...0> | P-op Tag |
| DIOBus | | | |
| <31...0> | WrData <31...0> | <31...0> | RdData <31...0> |

TABLE 4

| Data Exchange Bus Format | |
|---|---|
| Bits | Field |
| Cycle 1 $\phi 2$ | |
| <21> | APReq |
| <20> | NPHLd |
| <19> | NPReq |
| Bit(s) | Field |
| Cycle 2 $\phi 1$ | |
| <21...20> | TT (transfer type) |
| <19...16> | P-op Tag |
| <15...0> | Data <15...0> |
| Cycle 2 $\phi 2$ | |
| <18...16> | MemOp |
| <15...0> | Data <31...16> |

TABLE 5

| IEU Termination Bus Format | |
|---|---|
| On $\phi 2$ | |
| Bit(s) | Field |
| <4...2> | Pseudo-Op Tag |
| <1...0> | Termination Id |
| Pseudo-Op Tag Contains the 3 lsb's of the p-op tag of the p-op being terminated. | |

| Termination Id | |
|---|---|
| Value | Meaning |
| 00 | No Termination |
| 01 | Normal Termination |
| 10 | Mispredicted Branch Direction Termination |

TABLE 5-continued

| IEU Termination Bus Format | |
|---|---|
| 11 | Abnormal Termination |

TABLE 6

| AP Termination Bus Format | |
|---|---|
| Bit(s) | Field |
| | On φ2 |
| <3> | Termination Id, bit <7> |
| <2> | Id <6> |
| <1> | Control Bit B / Id <5> |
| <0> | Control Bit D / Id <4> |
| | On φ1 (usually) |
| <3> | Control Bit I / Id <3> |
| <2> | Control Bit N / Id <2> |
| <1> | Control Bit H / Id <1> |
| <0> | Control Bit S / Id <0> |

| Termination Id <7...0> | |
|---|---|
| Value | Meaning |
| 00XX XXXX | No termination |
| 01BD INHS | Control bit update |
| 10BD INHS | Mispredicted Address/Control Bit update |
| 110X XXXX | Normal Termination |
| 1110 0001 | Debug |
| 1111 0010 | Hypercode |
| 1111 0100 | General Protection (Instruction Sensitivities) |
| 1111 0101 | Debug (Breakpoint) |
| 1111 0110 | Invalid Opcode |
| 1111 0111 | 387 Not Available |
| 1111 1000 | Double Fault |
| 1111 1001 | Shutdown |
| 1111 1010 | Invalid TSS |
| 1111 1011 | Segment Not Present |
| 1111 1100 | Stack Fault |
| 1111 1101 | General Protection (except instruction) |
| 1111 1110 | Page Fault |

TABLE 7

Exemplary Sequence Illustrating Pseudo-Op Termination and Tracking

| | | | AP Term | | IEU Term | |
|---|---|---|---|---|---|---|
| | Tag | Pseudo-Op | Tag | Value | Tag | Value |
| | 3 | CHK } AG | | | | |
| | 4 | XFE } AG | | | | |
| A | 5 | XFE } | | | | |
| | 6 | DEC } AG | 3 | OK | | |
| B | | | | | | |
| | 7 | XFE } AG | 4 | OK | 3 | OK |
| | 8 | XFE } | | | | |
| | 9 | DEC | | | 6 | OK |
| C | | | 5 | OK | 4 | OK |
| | | | | | 5 | OK |
| | | | 6 | OK | 9 | OK |
| | | | 7 | OK | | |
| | | | 8 | Page Fault | | |
| | | | | | 7 | OK |
| D | | | | | | |

What is claimed is:

1. A computer processor comprising:

means for issuing a series of operations, each operation upon being issued being designated an outstanding operation;

a plurality of functional units, each capable of executing at least some of said outstanding operations;

means, coupled to said plurality of functional units, for communicating each said outstanding operation to at least one of said functional units for execution, with at least some of said outstanding operations being communicated to more than one of said functional units for execution by more than one of said functional units;

wherein (a) at least some of said outstanding operations are subject to normal termination by at least some of said functional units, (b) at least some of said outstanding operations are subject to abnormal termination by at least some of said functional units, and (c) a given functional unit receiving an operation to execute is, at least under some conditions, free to execute the operation to termination whether or not a previously issued operation to another functional unit has been executed to termination;

means for maintaining, for each outstanding operation, information regarding which functional units have terminated that operation and whether the termination was normal;

means, associated with at least one of said functional units, for determining with respect to each operation communicated to it for execution when that functional unit has terminated each operation and whether the termination was normal, and for communicating such termination information to said maintaining means;

means, responsive to said termination information from said functional units, for determining when any given outstanding operation has been terminated by all functional units that were to execute said given outstanding operation and whether the termination by all functional units that were to execute said given outstanding operation was normal or abnormal;

an outstanding operation that has been terminated normally by all functional units that were to execute that outstanding operation being referred to as having completed; and means for retiring completed operations, said means for retiring allowing a particular completed operation to cease being an outstanding operation and become a retired operation only if all outstanding operations that were issued before said particular completed operation have completed and are retired no later than said particular completed operation; and means for preventing any particular operation from irreversibly changing the programmer-visible state of the computer processor prior to the retirement of said particular operation.

2. The computer processor of claim 1, and further comprising:

means for assigning each outstanding operation a tag; and means for limiting the number of outstanding operations so as to insure that all operations outstanding at any given time have different tags.

3. The computer processor of claim 2 wherein:

said means for limiting allows at most n operations to be outstanding at any time; and tags are issued sequentially over a range greater than or equal to 2n;

whereupon the relative age of two outstanding operations may be determined by signed comparison of their tags.

4. The computer processor of claim 2 wherein:

at most n operations are outstanding at any time, and tags are represented as an N-bit vector (where N is equal to or greater than n) in which at most one bit is set; and tags are issued such that the set of outstanding operations is represented by a contiguous group of bits in the N-bit vector.

5. The computer processor of claim 4, and further comprising means, responsive to an abnormal condition and a determination that a set of outstanding operations is to be flushed, for communicating to said functional units an N-bit vector representing that the set of outstanding operations is to be flushed.

6. The computer processor of claim 5 wherein said N-bit vector representing that the set is to be flushed has those bits set that correspond to the set of operations to be flushed.

7. The computer processor of claim 4, and further comprising means, responsive to the completion of at least the oldest outstanding operation and a determination that a set of outstanding operations is to be retired, for communicating to the said functional units an N-bit vector representing that the set of outstanding operations is to be retired.

8. The computer processor of claim 7 wherein said N-bit vector representing that the set is to be retired has those bits set that correspond to the set of operations to be retired.

9. The computer processor of claim 1, wherein said functional units are embodied in a plurality of semiconductor chips.

10. The computer processor of claim 2, and further comprising:

means, responsive to an abnormal condition, for flushing all outstanding operations having tags issued later than a given tag.

11. The computer processor of claim 10, and further comprising:

means for grouping adjacent operations such that flushing of any operation in the group will cause flushing of all operations in the group.

12. The computer processor of claim 1 wherein at least some of said operations are branch operations, and further comprising:

means for predicating the outcome of outstanding branch operations;

means for detecting incorrect predictions on outstanding branch operations; and means for flushing all outstanding operations that were issued as a result of incorrectly predicted branch operations.

13. The computer processor of claim 2, and further comprising:

means for determining the oldest outstanding operation; and means for signaling successful retirement of operations to at least some of said functional units by providing a tag that marks the boundary between outstanding and retired operations.

14. The computer processor of claim 1, and further comprising:

means for grouping adjacent operations such that retirement of any operation in the group will be performed only when all operations in the group may be retired.

15. The computer processor of claim 13 wherein at least some operations specify a memory write, and further comprising:

means for buffering memory writes for at least a period of time during which their originating operations are outstanding but not retired;

means for flushing buffered writes when their originating operation is flushed; and means for completing buffered writes to cache or memory when their originating operation is retired.

16. The computer processor of claim 15, and further comprising:

means for returning buffered write data to subsequent read operations before the write data is flushed or placed in cache or memory.

17. The computer processor of claim 1 wherein said means for issuing is responsive to input instructions having an instruction set architecture wherein the programmer-visible state includes m virtual registers and at least some operations modify at least one of said virtual registers, and further comprising:

means for limiting the number of outstanding register-modifying operations to n;

at least (m+n) physical registers;

means for mapping said virtual registers to said physical registers;

means for insuring that physical registers are not reused before the operation which modified them has completed and all earlier issued operations have completed; and means, responsive to detection of an abnormal condition during the execution of a given operation, for restoring the virtual to physical mapping to a defined state relative to the given operation, thus restoring the contents of said virtual registers to values that existed at a time prior to said detection of an abnormal condition while avoiding the need to move data between said physical registers.

18. The computer processor of claim 17, and further comprising:

a valid bit associated with each physical register, each said valid bit having a set state signifying valid data and a clear state signifying invalid data;

means for examining the valid bits of all physical registers required as inputs to an operation; and means for holding up execution of a given operation if that operation requires a particular physical register and the particular physical register has a valid bit that is clear.

19. The computer processor of claim 1 wherein:

when an interlock is required, only the particular functional unit directly affected holds up execution of the interlocked operations.

20. The computer processor of claim 2 wherein:

at least some of said functional units signal terminations upon terminating at least some operations;

said terminations provide sufficient information to determine the tag of the terminated operation; and said terminations provide sufficient information to determine the highest priority abnormal condition (if any) detected by the functional unit while processing the operation.

21. The computer processor of claim 20, and further comprising:

means for prioritizing all terminations signaled by said functional units for each outstanding operation;

means for selecting the oldest abnormally terminated operation; and means for determining the correct response to the highest priority termination on the oldest abnormally terminated operation.

22. The computer processor of claim 20 wherein: terminations from said functional units may be signaled in a different order than the order in which the operations were issued.

23. The computer processor of claim 1, and further comprising means, responsive to the normal completion of at least the oldest outstanding operation and a determination that a set of outstanding operations is to be retired, for communicating to said functional units an indication of the tag of the outstanding operation issued immediately following the last operation in said set to be retired.

24. The computer processor of claim 1 wherein at least one functional unit includes an operation queue, and wherein that functional unit, upon receiving an operation to execute is, at least under some conditions, free to complete the operation whether or not a previously issued operation to that functional unit has completed.

25. A computer processor comprising:

means for issuing a series of operations, each operation upon being issued being designated an outstanding instruction;

a plurality of functional units, each capable of executing at least some of said operations;

means, coupled to said functional units, for communicating each of said outstanding operations to at least some of said functional units;

means for limiting the number of outstanding operations to a predefined maximum;

means, coupled to said first-mentioned communicating means, for assigning a tag to each outstanding operation, said tags being assigned in a sequential manner;

means, coupled to said first-mentioned communicating means, for maintaining, for each said outstanding operation, information regarding which ones of said functional units have terminated that operation and whether each said termination was normal;

means, associated with at least one of said functional units, for determining with respect to each operation communicated to it for execution when said functional unit has terminated the operation and whether the termination was normal, and for communicating such termination information to said maintaining means along with the tag of the operation;

means, coupled to said maintaining means, for determining the oldest: outstanding operation;

means for communicating an indication of said outstanding operations to said functional units;

means, responsive to the termination information regarding at least the oldest outstanding operation, for allowing that operation to be retired only if the termination information for that operation indicates that all functional units terminated that operation normally;

means, responsive to the retirement of at least the oldest outstanding operation, for updating said indication of the oldest outstanding operation to reflect that the operation, so retired, is no longer outstanding; and means, responsive to an abnormal termination of a given operation, for flushing at least said given operation and all operations that were issued later than said given operation.

means for preventing any particular operation from irreversibly changing the programmer-visible state of the computer processor prior to the retirement of said particular operation and the retirement of all operations that were issued earlier than said particular operation.

26. The computer processor of claim 25, and further comprising:

means, responsive to information that a given outstanding operation terminated abnormally, for communicating an abort tag to said functional units, specifying a group of operations to be flushed;

means, associated with each functional unit, for flushing all outstanding operations specified by said abort tag;

means for deleting the designations of outstanding operations for those operations specified by said abort tag; and means for causing said tag assigning means to commence assigning further tags starting at a value equal to the tag of the oldest operation flushed.

27. The computer processor of claim 26 wherein said abort tag is equal to the tag of the oldest operation that is to be flushed.

28. The computer processor of claim 25, wherein:

said means for limiting allows at most n operations to be outstanding at any time; and tags are issued sequentially over a range greater than or equal to 2n;

whereupon the relative age of two outstanding operations may be determined by signed comparison of their tags.

29. The computer processor of claim 25 wherein said means for issuing is responsive to instructions having an instruction set architecture wherein the programmer-visible state includes m virtual registers and at least some operations modify at least one of said virtual registers, and further comprising:

means for limiting the number of outstanding register-modifying operations to n;

at least (m+n) physical registers; and means for mapping said virtual registers to said physical registers.

30. The computer processor of claim 29, and further comprising:

means for insuring that physical registers are not reused until after the operation which modified them has been successfully retired; and means, responsive to the detection of an abnormal condition during the execution of a given operation, for restoring the virtual to physical mapping to a defined state relative to the given operation, thus restoring the contents of said virtual registers.

31. A method of controlling pipelined operations in a computer processor which includes a plurality of functional units, each capable of executing at least some of the operations, comprising the steps of:

issuing a series of operations, each operation upon being issued being designated an outstanding operation;

assigning each outstanding operation a tag, the tag being a member of an ordered set of tags such that the relative age of two outstanding operations may be determined by inspection of their tags;

limiting the number of outstanding operations so as to insure uniqueness of outstanding tags;

communicating each outstanding operation to at least one of the functional units, wherein a given functional unit receiving an operation to execute is, at least under some conditions, free to execute the operation to termination whether or not a previously issued operation to another functional unit has been executed to termination;

determining when any given outstanding operation has been terminated by all functional units that were to execute the given outstanding operation and whether such termination was normal or abnormal;

an outstanding operation that has been terminated normally by all functional units that were to execute that outstanding operation being referred to as having completed;

retiring completed operations by allowing each particular completed operation to cease being an outstanding operation and become a retired operation only if all outstanding operations that were issued before the particular completed operation have completed and are retired no later than the particular completed operation; and preventing any given operation from irreversibly changing the programmer-visible state of the computer processor prior to the retirement of that given operation.

32. The method of claim 31, wherein:

said limiting step allows at most n operations to be at any time; and tags are issued sequentially over a range greater than or equal to 2n;

whereupon the relative age of two outstanding operations may be determined by signed comparison of their tags.

33. The method of claim 31, and further comprising:

the steps, performed by the functional units, of signifying any abnormal condition; and the step of flushing all outstanding operations having tags issued later than a given tag.

34. The method of claim 33 and further comprising the step of grouping adjacent operations such that flushing of any operation in the group will cause flushing of all operations in the group.

35. The method of claim 31 wherein at least some of the operations are branch operations, and further comprising the steps of:

predicting the outcome of outstanding branch operations;

detecting incorrect predictions on outstanding branch operations; and flushing all outstanding operations which were issued as a result of incorrectly predicted branch operations.

36. The method of claim 31, and further comprising the steps of:

determining the oldest outstanding operation; and signaling successful retirement of operations to at least some of the functional units by providing a tag which marks the boundary between outstanding and retired operations.

37. The method of claim 31, and further comprising the step of grouping adjacent operations such that retirement of any operation in the group will be performed only when all operations in the group may be retired.

38. The method of claim 36, and further comprising the steps of:

buffering memory writes for at least the period of time during which their originating operations are outstanding but not retired;

flushing buffered writes when their originating operation is flushed; and completing buffered writes to cache or memory when their originating operation is retired.

39. The method of claim 38, and further comprising the step of returning buffered write data to subsequent read operations before the write data is flushed or placed in cache or memory.

40. The method of claim 31 wherein said issuing step is responsive to input instructions having an instruction set architecture wherein the programmer-visible state includes m virtual registers and at least some operations modify at least one of the virtual registers, and further comprising the steps of:

limiting the number of outstanding register-modifying operations to n;

providing at least $(m+n)$ physical registers; and mapping the virtual registers to the physical registers.

41. The method of claim 40, and further comprising the steps of:

insuring that physical registers are not reused until after the operation which modified them has been successfully retired; and restoring the virtual to physical mapping to a previous state when an abnormal condition is detected, thus restoring the contents of the virtual registers.

42. A computer processor comprising:

means for issuing a series of operations, each operation upon being issued being designated an outstanding instruction;

a plurality of functional units, each capable of executing at least some of said operations;

means for communicating each of said outstanding operations to at least some of said functional units;

means for limiting the number of outstanding operations to a predefined maximum;

means for assigning a tag to each outstanding operation, said tags being assigned in a sequential manner;

means for maintaining, for each outstanding operation, information regarding which functional units have terminated that operation and whether the termination was normal or abnormal;

means, associated with each functional unit, for determining with respect to each operation communicated to it for execution when said functional unit has terminated the operation and whether the termination was normal, and for communicating such termination information to said maintaining means along with the tag of the operation;

means for communicating an indication of outstanding operations to said functional units;

means, responsive to termination information from said functional units, for retiring normally terminated operations in order;

means, responsive to information that a given outstanding operation terminated abnormally, for instructing said functional units to flush at least the given outstanding operation and all later outstanding operations;

means, associated with said functional units, for flushing all outstanding operations specified by said instructing means; and means for causing said tag assigning means to commence assigning further tags beginning with the tag that was associated with the oldest outstanding operation that was flushed; and means for preventing any particular operation from irreversibly changing the programmer-visible state of the computer processor prior to the retirement of said particular operation and the retirement of all operations that were issued earlier than said particular operation.

43. The computer processor of claim 42 wherein said representation of outstanding tags is the tag of the oldest outstanding operation.

44. The computer processor of claim 42, wherein:
said means for limiting allows at most n operations to be outstanding at any time; and
tags are issued sequentially over a range greater than or equal to 2n;
whereupon the relative age of two outstanding operations may be determined by signed comparison of their tags.

45. The computer processor of claim 42 wherein said means for issuing is responsive to instructions having an instruction set architecture wherein the programmer-visible state includes m virtual registers and at least some operations modify at least one of said virtual registers, and further comprising:
means for limiting the number of outstanding register-modifying operations to n;
at least (m+n) physical registers; and
means for mapping said virtual registers to said physical registers.

46. The computer processor of claim 45, and further comprising:
means for insuring that physical registers are not reused until after the operation which modified them has been successfully retired; and
means, responsive to the detection of an abnormal condition during the execution of a given operation, for restoring the virtual to physical mapping to a defined state relative to the given operation, thus restoring the contents of said virtual registers.

47. A computer processor, characterized by a programmer-visible state, comprising:
means for issuing a series of operations, each operation upon being issued being designated an outstanding operation;
means for assigning each outstanding operation a tag, the tag being a member of an ordered set of tags such that the relative age of two outstanding operations may be determined by inspection of their tags;
means for limiting the number of said outstanding operations so as to insure uniqueness of outstanding tags;
a plurality of functional units, each capable of executing at least some of said outstanding operations;
means, coupled to said plurality of functional units, for communicating each said outstanding operation and that operation's tag to at least one of said functional units;
wherein (a) at least some of said outstanding operations are subject to normal termination by at least some of said functional units, (b) at least some of said outstanding operations are subject to abnormal termination by at least some of said functional units, and (c) a given functional unit receiving an operation to execute is, at least under some conditions, free to terminate the operation whether or not a previously issued operation to another functional unit has been terminated;

means, associated with at least one of said functional units, for determining with respect to each operation communicated to it for execution when that functional unit has terminated each operation and whether the termination was normal, and for communicating such termination information to said maintaining means along with the tag of the operation;

means for determining when any given outstanding operation has been terminated by all functional units that were to execute said given outstanding operation and whether the termination by all functional units was normal or abnormal;

an outstanding operation that has been terminated normally by all functional units that were to execute that outstanding operation being referred to as having completed;

means, responsive to an abnormal condition, for flushing all outstanding operations having tags issued later than a given tag;

means for retiring completed operations, said means for retiring allowing a particular completed operation to cease being an outstanding operation and become a retired operation only if all outstanding operations that were issued before said particular completed operation have completed and are retired no later than said particular completed operation; and means for preventing any particular operation from irreversibly changing the programmer-visible state of the computer processed prior to the retirement of said particular operation.

48. The computer processor of claim 47, and further comprising means, responsive to an abnormal condition and a determination that a set of outstanding operations is to be flushed, for communicating to said functional units an indication that said set of outstanding operations is to be flushed and an indication of the tag of the oldest outstanding operation to be flushed.

49. The computer processor of claim 47 wherein:
said means for limiting allows at most n operations to be outstanding at any time; and
tags are issued sequentially over a range greater than or equal to 2n;
whereupon the relative age of two outstanding operations may be determined by signed comparison of their tags.

50. The computer processor of claim 47, and further comprising:
means for grouping adjacent operations such that flushing of any operation in the group will cause flushing of all operations in the group.

51. The computer processor of claim 47 wherein at least some of said operations are branch operations, and further comprising:
means for predicting the outcome of outstanding branch operations;
means for detecting incorrect predictions on outstanding branch operations; and means for flushing all outstanding operations that were issued as a result of incorrectly predicted branch operations.

53. The computer processor of claim 47, and further comprising:
means for grouping adjacent operations such that retirement of any operation in the group will be performed only when all operations in the group may be retired.

53. The computer processor of claim 47, wherein at least some of said outstanding operations are communicated to more than one of said functional units for execution.

54. A computer processor comprising:
means for issuing a series of operations, each operation upon being issued being designated an outstanding operation;
said operations having an instruction set architecture with a programmer-visible state that includes m virtual registers wherein at least some operations, referred to as register-modifying operations, modify at least one of said virtual registers;
means for limiting the number of said outstanding operations to a particular number, including means for limiting the number of outstanding register-modifying operations to n;
a plurality of functional units, each capable of executing at least some of said outstanding operations, with at least one functional unit capable of executing at least one register-modifying operation;
at least (m+n) physical registers;
means for maintaining a mapping of said virtual registers to said physical registers so that (a) each operation having virtual register operands specifies physical registers based on said mapping, and (b) the content of a given virtual register is the content of the physical register specified by said mapping;
said means for maintaining a mapping further operating to maintain previous states of said mapping for outstanding register-modifying operations;
means, coupled to said plurality of functional units, for communicating each said outstanding operation to at least one of said functional units, wherein (a) at least some of said outstanding operations are subject to normal termination by at least some of said functional units, (b) at least some of said outstanding operations are subject to abnormal termination by at least some of said functional units, and (c) a given functional unit receiving an operation to execute is, at least under some conditions, free to terminate the operation whether or not a previously issued operation to another functional unit has terminated;
means for determining when any given outstanding operation has been terminated by all functional units that were to execute said given outstanding operation and whether the termination was normal;
an outstanding operation that has been terminated normally by all functional units that were to execute that outstanding operation being referred to as having completed;
means for insuring that a given physical register is not reused until after the completion of a particular operation which has modified the given physical register and the completion of all operations that were issued before said particular operation; and
means, responsive to detection of an abnormal condition during the execution of a given operation, for restoring said mapping to a defined state relative to the given operation, thus restoring the contents of said virtual registers to values that existed at a time prior to said detection of an abnormal condition while avoiding the need to move data between said physical registers.

55. The computer processor of claim 54 wherein each functional unit capable of executing register-modifying operations has its own set of (m+n) physical registers.

56. The computer processor of claim 54, wherein at least some of said outstanding operations are communicated to more than one of said functional units for execution.

* * * * *